US009368969B2

(12) United States Patent
Tsuchiya

(10) Patent No.: US 9,368,969 B2
(45) Date of Patent: Jun. 14, 2016

(54) ELECTRIC POWER SUPPLY SYSTEM

(75) Inventor: Shizuo Tsuchiya, Gifu (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 615 days.

(21) Appl. No.: 13/372,944

(22) Filed: Feb. 14, 2012

(65) Prior Publication Data

US 2012/0206104 A1 Aug. 16, 2012

(30) Foreign Application Priority Data

Feb. 15, 2011 (JP) .................................. 2011-030000
Feb. 15, 2011 (JP) .................................. 2011-030001

(51) Int. Cl.
| H02J 7/00 | (2006.01) |
| H02J 3/32 | (2006.01) |
| H02J 3/34 | (2006.01) |
| B60L 11/18 | (2006.01) |
| H02J 3/38 | (2006.01) |
| H02J 7/02 | (2016.01) |

(52) U.S. Cl.
CPC ............... *H02J 3/32* (2013.01); *B60L 11/1842* (2013.01); *H02J 3/381* (2013.01); *H02J 7/022* (2013.01); *Y02E 60/721* (2013.01); *Y02T 10/7005* (2013.01); *Y02T 10/7072* (2013.01); *Y02T 90/121* (2013.01); *Y02T 90/128* (2013.01); *Y02T 90/14* (2013.01); *Y02T 90/163* (2013.01); *Y04S 10/126* (2013.01)

(58) Field of Classification Search
USPC ........................................... 307/46; 320/109
See application file for complete search history.

(56) References Cited

U.S. PATENT DOCUMENTS

| 6,104,160 A * | 8/2000 | Iwata et al. .................... 320/103 |
| 2008/0316774 A1* | 12/2008 | Ito et al. ........................... 363/17 |
| 2009/0192655 A1* | 7/2009 | Ichikawa et al. ............... 700/291 |
| 2010/0017045 A1* | 1/2010 | Nesler et al. ................... 700/296 |
| 2011/0055037 A1* | 3/2011 | Hayashigawa et al. ....... 705/26.1 |
| 2011/0140667 A1* | 6/2011 | Moon ............................ 320/134 |
| 2011/0298422 A1* | 12/2011 | Failing .......................... 320/109 |
| 2012/0074901 A1* | 3/2012 | Mohammed ................... 320/109 |

FOREIGN PATENT DOCUMENTS

JP 2008-054439 3/2008

* cited by examiner

*Primary Examiner* — Richard Isla Rodas
*Assistant Examiner* — David V Henze-Gongola
(74) *Attorney, Agent, or Firm* — Harness, Dickey & Pierce, P.L.C.

(57) ABSTRACT

An alternating-current power line is wired in a building for supplying alternating-current electricity to an electric load. A bidirectional power converter converts bilaterally between alternating-current electricity and direct-current electricity. A power storage unit is connected to the alternating-current power line through the bidirectional power converter. The power storage unit is charged with electricity from the alternating-current power line and discharges direct-current electricity into the alternating-current power line. A charge-and-discharge unit charges a vehicular power accumulating device with alternating-current electricity supplied from the alternating-current power line through a connecting terminal and discharges electricity outputted as alternating-current electricity from the vehicle to the connecting terminal. A power converter converts alternating-current electricity outputted from the vehicle through the connecting terminal into direct-current electricity and discharges the converted direct-current electricity through the bidirectional power converter into the alternating-current power line.

9 Claims, 6 Drawing Sheets

ELECTRIC POWER SUPPLY SYSTEM

CROSS REFERENCE TO RELATED APPLICATION

This application is based on Japanese Patent Applications No. 2011-30000 filed on Feb. 15, 2011 and No. 2011-30001 filed on Feb. 15, 2011, the disclosure of which is incorporated herein by reference.

TECHNICAL FIELD

The present invention relates to an electric power supply system. More specifically, the present invention relates to, for example, an electric power supply system using a power accumulating device equipped in a vehicle, such as a plug-in hybrid vehicle and an electric vehicle, as an electric power supply source for supplying electricity into an alternating-current power line in a building.

BACKGROUND

JP-A-2008-54439 discloses an electric power system. The electric power system of JP-A-2008-54439 has a configuration in which a cable is extended from a vehicle equipped with a power accumulating device, and the connector of the cable is connectable with a connector coupled to a power line cable equipped in a residence. In this configuration, the vehicle and the power line cable in the residence are enabled to transfer alternating-current electricity through an electricity supply system including these cables and both the connectors.

In this configuration, the vehicle is equipped with a conversion device configured to implement DC-AC conversion and voltage conversion. When the power accumulating device is charged with electricity and discharge electricity, electricity is transferred by using the electricity supply system and the conversion device. In the configuration of JP-A-2008-54439, in both cases where the power accumulating device equipped in the vehicle is charged with electricity through the power line cable in the residence and where the power accumulating device discharges electricity through the power line cable, the electricity is transferred through the same electricity supply system and by using the voltage conversion device.

In general, it is desirable to supply stable electricity, which is significantly constant in properties such as voltage, into an alternating-current power line installed in a building for supplying alternating-current electricity to an electric load connected with the alternating-current power line. To the contrary, a power accumulating device equipped in a vehicle is configured to supply electricity, in general, having a large fluctuation due to influence of an external environment.

In the electric power system of JP-A-2008-54439, the power accumulating device equipped in the vehicle may be charged with electricity without a significant difficulty. Nevertheless, in the configuration of JP-A-2008-54439, when the power accumulating device discharges electricity into the alternating-current power line in a building through the same electricity supply system by using the same conversion device, the alternating-current power line may be exerted with an adverse effect due to unstability of the discharged electricity.

In order to solve such an adverse effect, it is conceivable to modify the conversion device in the vehicle into a highly efficient device and/or to provide an additional device into the electricity supply system between the vehicle and the alternating-current power line in a building in order to stabilize electricity. Nevertheless, in both the cases, a complicated device is needed for stabilizing discharged electricity.

SUMMARY

It is an object to provide an electric power supply system configured, without an additional complicated device, to stabilize electric discharge from a power accumulating device equipped in a vehicle into an alternating-current power line equipped in a building.

The present inventor has focused attention on an electric power supply system including a power storage unit, which is different from a vehicular power accumulating device and is connected with an alternating-current power line through a bidirectional power converter, such as a bidirectional power conditioner. The present inventor has further focused attention on that the electric power supply system has a capability to enable the bidirectional power converter to stabilize the electricity discharged from the power storage unit. That is, the present inventor has found out to utilize the bidirectional power converter to stabilize electric discharge from the vehicular power accumulating device into the alternating-current power line equipped in a building, without an additional complicated device.

According to an aspect, an electric power supply system comprises an alternating-current power line wired in a building and connected to an electric load for supplying alternating-current electricity to the electric load. The electric power supply system further comprises a bidirectional power converter configured to convert bilaterally between alternating-current electricity and direct-current electricity. The electric power supply system further comprises a power storage unit connected to the alternating-current power line through the bidirectional power converter and configured to be charged with electricity from the alternating-current power line and discharge direct-current electricity stored in the power storage unit into the alternating-current power line. The electric power supply system further comprises a charge-and-discharge unit equipped with a connecting terminal portion connectable with a vehicle and configured to charge a vehicular power accumulating device equipped in the vehicle with alternating-current electricity supplied from the alternating-current power line through the connecting terminal portion to the vehicle and discharge electricity of the vehicular power accumulating device outputted as alternating-current electricity from the vehicle to the connecting terminal portion. The charge-and-discharge unit includes a power converter configured to convert alternating-current electricity outputted from the vehicle through the connecting terminal portion into direct-current electricity and discharge direct-current electricity converted with the power converter through the bidirectional power converter into the alternating-current power line.

According to another aspect, an electric power supply system comprises an alternating-current power line wired in a building and connected to an electric load for supplying alternating-current electricity to the electric load. The electric power supply system further comprises a bidirectional power converter configured to convert bilaterally between alternating-current electricity and direct-current electricity. The electric power supply system further comprises a power storage unit connected to the alternating-current power line through the bidirectional power converter and configured to be charged with electricity from the alternating-current power line and discharge direct-current electricity stored in the power storage unit into the alternating-current power line. The electric power supply system further comprises an alternating-current charge-and-discharge unit equipped with a first connecting terminal portion connectable with a vehicle and configured to charge a vehicular power accumulating device equipped in the vehicle with alternating-current electricity supplied from the alternating-current power line through the first connecting terminal portion to the vehicle and discharge alternating-current electricity outputted from the vehicular power accumulating device to the first connecting terminal portion when the vehicular power accumulating device discharges the alternating-current electricity. The electric power supply system further comprises a direct-current discharge unit equipped with a second connecting terminal portion connectable with the vehicle and configured to discharge direct-current electricity outputted from the vehicle to the second connecting terminal portion when the vehicular power accumulating device discharges the direct-current electricity. The alternating-current charge-and-discharge unit includes a power converter configured to convert alternating-current electricity outputted from the vehicle to the first connecting terminal portion into direct-current electricity. The alternating-current charge-and-discharge unit is configured to discharge direct-current electricity converted with the power converter through the bidirectional power converter into the alternating-current power line. The direct-current discharge unit is further configured to discharge direct-current electricity, which is outputted from the vehicle to the second connecting terminal portion, through the bidirectional power converter into the alternating-current power line.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

As follows, embodiments will be described with reference to drawings. When only a part of a configuration of an element is described in an embodiment, other part of the configuration of the element may be equivalent to that of another foregoing embodiment. The present disclosure is not limited to combinations of elements specifically described in the embodiments. The elements of the embodiments may be entirely or partially combined arbitrary as long the combination is feasible.

First Embodiment

Figure 1:
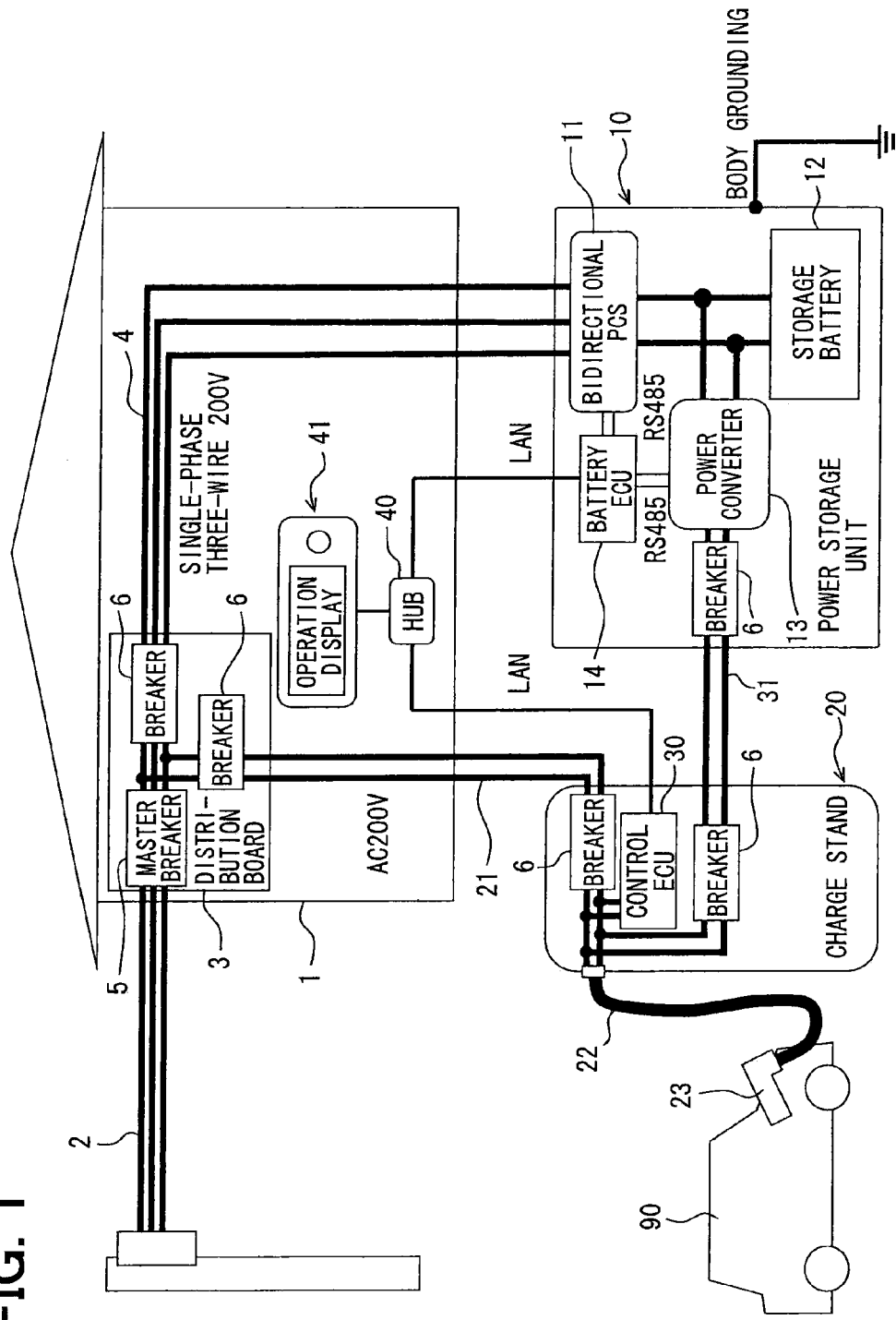
FIG. 1 is a schematic diagram showing an electric power supply system according to the first embodiment.
Figure 2:
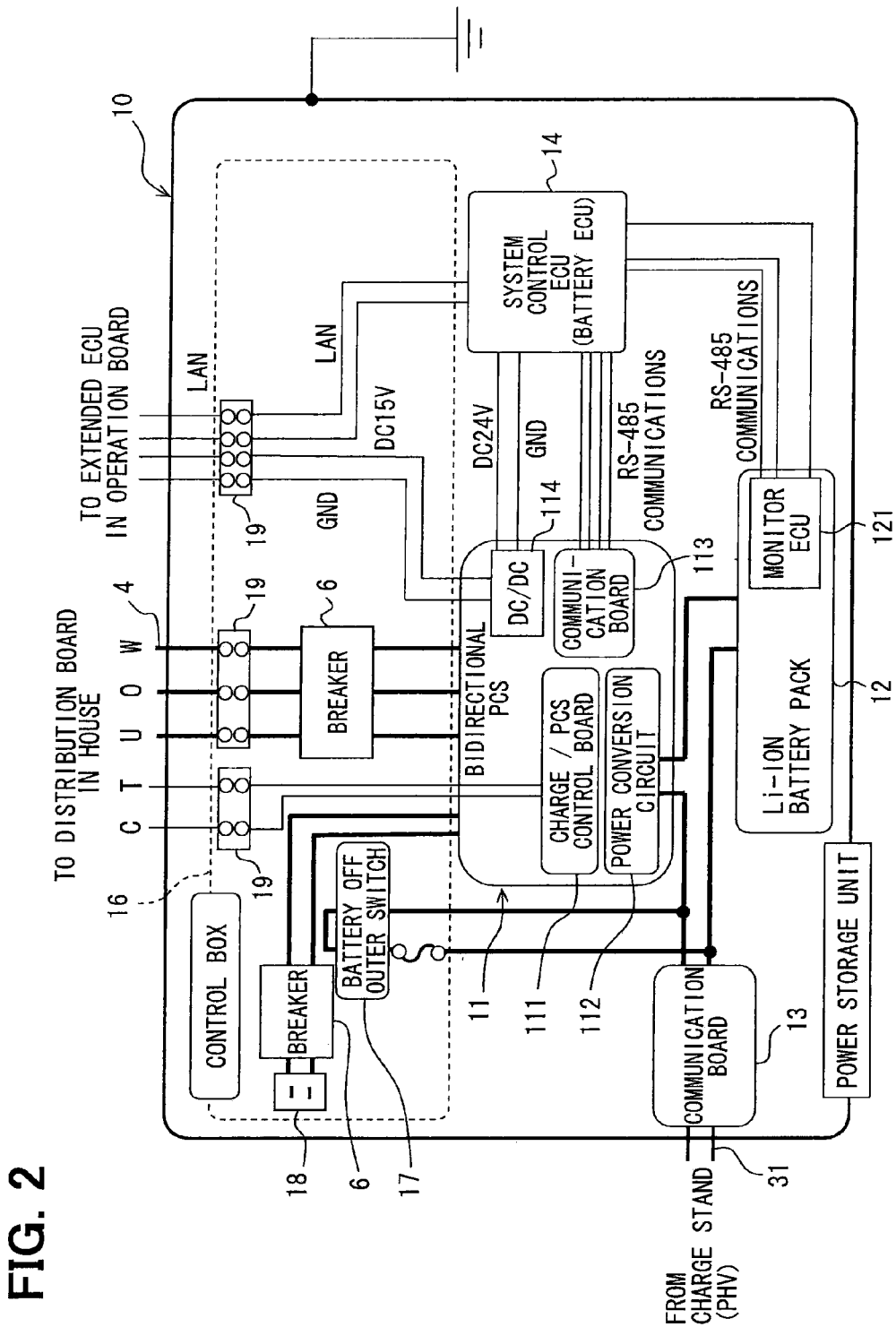
FIG. 2 is a schematic diagram showing an electric power storage unit for the electric power supply system.

FIG. 1 is a schematic diagram showing an electric power supply system according to the first embodiment. FIG. 2 is a schematic diagram showing an electric power storage unit 10 for the electric power supply system.

Figure 3:
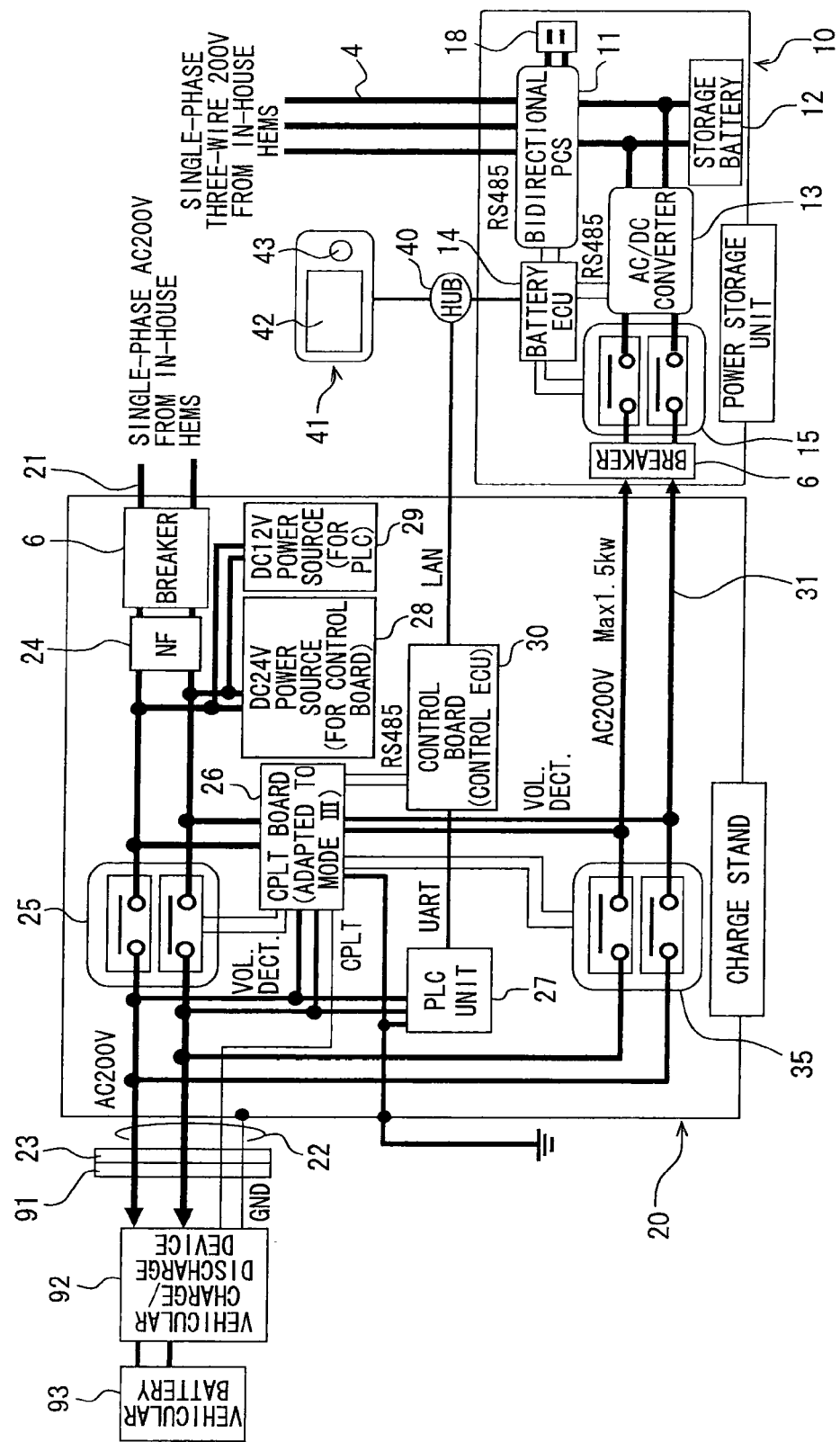
FIG. 3 is a schematic diagram showing an electric power storage unit and a charge stand for the electric power supply system.

FIG. 3 is a schematic diagram showing an electric power storage unit 10 and a charge stand 20 for the electric power supply system.

As shown in FIG. 1, the electric power supply system of the present embodiment includes an alternating-current power line 4, a power storage unit 10, the charge stand 20, and an operation display unit 41. The alternating-current power line 4 is wired with a building 1 such as a residence. The power storage unit 10 is electrically connected with the alternating-current power line 4. The charge stand 20 is for supplying electricity fed from the alternating-current power line 4 to the vehicle 90 to charge a vehicular battery. The operation display unit 41 is connected with the power storage unit 10 and the charge stand 20 via a telecommunication unit such as a telecommunication cable. The vehicle 90 is, for example, an automobile, which is equipped with a power accumulating device with a relatively large capacity, such as a plug-in hybrid vehicle or an electric vehicle.

The alternating-current power line 4 wired in the building 1 is a power line such as a single-phase three-wire type power line including one neutral line and two voltage lines. The alternating-current power line 4 is supplied with a grid power from a power system 2 of an electric power company via a distribution board 3. The distribution board 3 is equipped with a master breaker 5 and a current breaker 6. The current breaker 6 has a short circuit detection function to regulate an upper limit of an electric current flowing into each circuit system. In FIG. 1, elements located out of the distribution board 3 and each denoted with the reference numeral 6 are also current breakers (short circuit breakers) having the short circuit detection function.

The alternating-current power line 4 may be further configured to receive external power such as natural energy (reusable energy) obtained at various power generation facilities. The external power may be sunlight energy, solar thermal energy, wind power energy, hydraulic power energy, and/or the like. The alternating-current power line 4 is connectable with various electric devices (electric load, not shown) and is configured to supply electric power to the electric devices.

The alternating-current power line 4 is connected with the power storage unit 10 (power storage system, e-Station). The power storage unit 10 is, for example, located outside the building 1. The power storage unit 10 includes a bidirectional power conditioner 11, a storage battery 12, a power converter 13, a storage battery ECU (storage battery control device) 14, and the like. The storage battery 12 is, for example, an aggregate of combined multiple unit batteries each being a rechargeable battery such as a lithium ion battery.

As shown in FIG. 2, the bidirectional power conditioner (bidirectional PCS) 11 includes a charge and PCS control board 111, a power source conversion circuit 112, a communication board 113, and a DC-DC converter 114. The storage battery 12 is electrically connected with the alternating-current power line 4 through the bidirectional power conditioner 11. The storage battery 12 is configured to charge the alternating-current electricity supplied through the alternating-current power line 4 and to discharge direct-current electricity stored in the storage battery 12 through the alternating-current power line 4.

When the storage battery 12 is charged and is discharged, the power source conversion circuit 112 is configured to implement AC-DC conversion, to control the voltage, and to control charge-and-discharge electric power, according to a command of the charge and PCS control board 111 of the bidirectional power conditioner 11. The charge and PCS control board 111 is configured to receive a signal from an electric current sensor (not shown) through a joining terminal stand 19. The joining terminal stand 19 is located in a control box 16. The electric current sensor is equipped on the power line on the upstream side of the master breaker 5. When the storage battery 12 discharges electricity to the alternating-current power line 4, the charge and PCS control board 111 is configured to activate a relay device (not shown) to prohibit electric discharge on detection of adverse current flow to the power system 2 though the alternating-current power line 4 according to an input signal from the electric current sensor.

A power supply line is extended from the DC-DC converter 114 to the storage battery ECU 14 and the operation display unit 41 (refer to FIG. 1) thereby to enable activation of the storage battery ECU 14 and the operation display unit 41 in a state of power failure of the grid power of the power system 2.

As shown in FIG. 1 and FIG. 2, the storage battery ECU 14 is connected with the bidirectional power conditioner 11, the storage battery 12, and the power converter 13 via a communication line. In the present configuration, the storage battery ECU 14 is configured to control operation of the bidirectional power conditioner 11, operation of the storage battery 12, and operation of the power converter 13 by implementing communications in compliance with a telecommunications standard such as RS-485. Specifically, as shown in FIG. 2, the storage battery ECU 14 is connected communicably with the communication board 113 of the bidirectional power conditioner 11. The storage battery ECU 14 is further connected communicably with a storage battery monitor ECU (storage battery monitor unit) 121 equipped in the storage battery 12.

Referring to FIG. 1, the storage battery ECU 14 is connected with the operation display unit 41 and the control ECU 30 of the charge stand 20 though a hub 40 and is communicated with each other via the LAN (local area network) thereby enabled to implement mutual information exchange (communication of information) thereamong. Referring to FIG. 2, the LAN cable is extended from the storage battery ECU 14. The LAN cable and the power supply line, which is extended from the DC-DC converter 114, are extended to the joining terminal stand 19 in the control box 16. The LAN cable and the power supply line from the DC-DC converter 114 are further extended out of the power storage unit 10 and are connected with to an extended ECU located in the operation display unit 41.

The control box 16 accommodates the joining terminal stand 19, a battery OFF outer switch device 17, a direct-current fuse, a standard-type electric socket 18, and the like. The joining terminal stand 19 is for connecting the alternating-current power line 4 extended from the building 1 with an internal wiring of the power storage unit 10. The battery OFF outer switch device 17 opens and closes the charge-and-discharge system of the storage battery 12. The direct-current fuse is equipped in the charge-and-discharge system of the storage battery 12. The standard-type electric socket 18 is for 100V system.

The bidirectional power conditioner 11 may be equivalent to a bidirectional power converter bilaterally convertible between alternating-current electricity and direct-current electricity in the present embodiment. The storage battery 12 may be equivalent to a power storage unit of the present embodiment. The power storage unit is connected with the alternating-current power line 4 through the bidirectional power converter and is configured to be charged with electricity supplied through the alternating-current power line 4. The power storage unit is further configured to discharge direct-current electricity into the alternating-current power line 4.

Referring to FIG. 1, the charge stand 20 is, for example, provided outside the building 1 separately from the power storage unit 10. The charge stand 20 is connected with a charge power line 21 branched at the distribution board 3 from the alternating-current power line 4. The charge power line 21 is extended to the inside of the charge stand 20 and is connected with a charge-and-discharge cable 22 extended outside from the body of the charge stand 20. The tip end of the charge-and-discharge cable 22 is connected with a charge-and-discharge connector 23 (connection terminal portion).

The charge power line 21 is branched from a discharge power line 31 in the body of the charge stand 20. The discharge power line 31 is extended outside from the body of the charge stand 20 into the power storage unit 10. The discharge power line 31 located in the power storage unit 10 is connected with the storage battery 12 in parallel with a power line, which connects the bidirectional power conditioner 11 with the storage battery 12.

As shown in FIG. 3, the breaker 6, a noise filter 24, and a relay device 25 are interposed in the charge power line 21 pulled into the charge stand 20. The breaker 6, the noise filter 24, and the relay device 25 are arranged in order from the upstream side and located on the upstream side of the connection point with the discharge power line 31 in the direction of power supply. A relay device 35 is interposed in the discharge power line 31 pulled into the charge stand 20. The breaker 6, a relay device 15, and the power converter (AC-DC converter) 13 are interposed in the discharge power line 31 pulled into the power storage unit 10 and are arranged in order from the upstream side of the electricity supply. The relay devices 15, 25, and 35 are configured to open and close an electric circuit according to an electric signal. In the present example, each of the relay devices 15, 25, and 35 has a configuration to connect and disconnect two circuits therein.

The charge stand 20 accommodates a CPLT board 26, a PLC unit 27, a control ECU (control board) 30, an electric power unit 28 for the control board, and an electric power unit 29 for the PLC unit.

The CPLT board 26 is configured to output an opening-and-closing actuating signal of the relay devices 25 and 35, to detect the voltage of the charge power line 21 in the downstream of the relay device 25, and to detect the voltage of the discharge power line 31 on the downstream side of the relay device 35. The CPLT board 26 is further configured to generate a CPLT signal (control pilot signal) and to output the generated CPLT signal thereby to exchange signals with a vehicular charge-and-discharge device 92 equipped on the vehicle 90. The CPLT board 26 has a main configuration to control charge of the vehicular battery 93.

FIG. 3 shows a CPLT line and a GND line together with the power line contained in the charge-and-discharge cable 22 and configured to conduct the CPLT signal. The CPLT board 26 is supplied with electricity through the charge power line 21 on the upstream side of the relay device 25 thereby being activated. The CPLT board 26 is communicable with the control ECU 30 by implementing communications in compliance with a telecommunications standard such as RS-485.

The PLC (power line communication) unit 27 is configured to implement communications with the vehicle 90 through the power line in the charge-and-discharge cable 22. The PLC unit 27 is supplied with electricity from the DC power unit 29 connected with the charge power line 21 on the upstream side of the relay device 25 thereby being activated. The PLC unit 27 is communicable with the control ECU 30 by implementing, for example, UART (universal asynchronous reception and transmission), which is for implementing asynchronous serial communications.

The vehicle 90 (FIG. 1) is equipped with a connector 91, which is a slot of the charge-and-discharge connector 23. The charge-and-discharge connector 23 of the charge stand 20 is connected to the connector 91 thereby to enable charge and discharge of the vehicular battery 93 via the vehicular charge-and-discharge device 92. When the vehicular battery 93 is charged with electricity, the connector 91 is supplied with alternating-current electricity, and the vehicular charge-and-discharge device 92 converts the supplied alternating-current electricity into direct-current electricity thereby to charge the vehicular battery 93 with the converted direct-current electricity. Alternatively, when the vehicular battery 93 discharges electricity, the vehicular charge-and-discharge device 92 converts direct-current electricity stored in the vehicular battery 93 into alternating-current electricity, and the converted alternating-current electricity is discharged to the charge-and-discharge connector 23 through the connector 91.

The control ECU 30 is supplied with electricity from the DC power unit 28 connected to the charge power line 21 on the upstream side of the relay device 25 thereby being activated. The control ECU 30 implements communications with the CPLT board 26, the PLC unit 27, the storage battery ECU 14, and the operation display unit 41, thereby to control charge and discharge of the vehicular battery 93 which functions as a vehicular power accumulating device. The control ECU 30 may be equivalent to an electric charge control unit for the vehicular power accumulating device and may be also equivalent to a discharge control unit for the vehicular power accumulating device. That is, the control ECU 30 may be equivalent to an electric charge and discharge control unit for the vehicular power accumulating device.

The operation display unit 41 is a remote operation unit (remote controller) provided in, for example, the building 1. The operation display unit 41 includes a display unit 42 and an operation switch device 43. The display unit 42 may be equivalent to an announcement unit. The operation switch device 43 may be equivalent to a permission state setting unit configured to set the output state of electricity from the vehicle 90 into a permission state. The announcement unit is not limited to an indication unit such as the display unit 42 and may be another device such as a sounding unit. The announcement unit may be a combination with another device.

The configuration including the charge stand 20, the charge power line 21, the hub 40, the operation display unit 41, the relay device 15, the power converter 13 including the discharge power line 31, and the storage battery ECU 14 may be equivalent to a charge-and-discharge unit of the present embodiment.

As follows, an example of operation of the electric power supply system with the above-described configuration will be described.

In a charge mode where the vehicular battery 93 is charged with electricity, the control ECU 30 first confirms whether the charge-and-discharge connector 23 is connected to the vehicle 90 via the CPLT communications or the like. The control ECU 30 further transmits information about completion of the connection to the operation display unit 41 in the house through the LAN, when the charge-and-discharge connector 23 is connected to the vehicle 90. The transmission may be implemented, specifically, via the CPLT communications and/or the RS-485 communications through the CPLT board 26. The operation display unit 41 may cause the display unit 42 to indicate the completion of the connection.

Subsequently, the control ECU 30 deactivates the relay devices 25 and 35 and confirms whether each output of the relay devices 25 and 35 is not applied with voltage thereby to detect whether welding is not caused in each output of the relay devices 25 and 35. Thereafter, the control ECU 30 activates the relay device 25 and starts the PLC communications. The control ECU 30 implements the PLC communications (the PLC communications and the UART communications through the PLC unit 27) and/or the like to transmit detected vehicular information about the vehicle 90 to the operation display unit 41 through the LAN. The operation display unit 41 may cause the display unit 42 to indicate the vehicular information.

For example, when an operation switch device or the like is manipulated to cause the operation display unit 41 to transmit a charge start command through the LAN, the control ECU 30 activates the relay device 25 and deactivates the relay device 35. Thus, the control ECU 30 implements the CPLT communications and/or the like to instruct the vehicular charge-and-discharge device 92 to start charging with specified electricity.

When the control ECU 30 detects end of charge of the vehicular battery 93 on reception of the CPLT signal and/or the like, the control ECU 30 transmits charge end information to the operation display unit 41 through the LAN. Thus, the control ECU 30 turns into a standby mode. The operation display unit 41 may cause the display unit 42 to indicate the charge end information.

For example, when an operation switch device or the like is manipulated to cause the operation display unit 41 to transmit a charge termination command through the LAN, the control ECU 30 implements the CPLT communications and/or the like to cause the vehicular charge-and-discharge device 92 to terminate the charge operation. Thus, the control ECU 30 turns into a standby mode.

On confirmation that the charge-and-discharge connector 23 is detached from the vehicle 90 via the CPLT communications and/or the like, the control ECU 30 deactivates the relay device 25 and transmits information about detachment of the charge-and-discharge connector 23 to the operation display unit 41 through the LAN. The operation display unit 41 may cause the display unit 42 to indicate the information about detachment of the charge-and-discharge connector 23.

Alternatively, in a discharge mode where the vehicular battery 93 discharges electricity, the control ECU 30 first confirms whether the charge-and-discharge connector 23 is connected to the vehicle 90 via the CPLT communications or the like. The control ECU 30 further transmits information about completion of the connection to the operation display unit 41 through the LAN, when the charge-and-discharge connector 23 is connected to the vehicle 90. The transmission may be implemented, specifically, via the CPLT communications and/or the RS-485 communications through the CPLT board 26. The operation display unit 41 may cause the display unit 42 to indicate the completion of the connection.

Subsequently, the control ECU 30 deactivates the relay devices 25 and 35 and confirms whether each output of the relay devices 25 and 35 is not applied with voltage thereby to detect whether welding is not caused in each output of the relay devices 25 and 35. Thereafter, the control ECU 30 activates the relay device 25 and starts the PLC communications. The control ECU 30 implements the PLC communications (the PLC communications and the UART communications through the PLC unit 27) and/or the like to transmit detected information about the vehicle 90 to the operation display unit 41 through the LAN. The operation display unit 41 may cause the display unit 42 to indicate the vehicular information. For example, the display unit 42 is caused to indicate whether the vehicular battery 93 of the vehicle 90 has a surplus accumulation of electricity exceeding an accumulation of electricity required for a subsequent vehicle traveling operation.

For example, when the vehicular battery 93 of the vehicle 90 has a surplus accumulation of electricity and when, for example, the operation switch device 43 is manipulated to cause the operation display unit 41 to transmit a discharge start command through the LAN, the control ECU 30 deactivates the relay device 25 and activates the relay device 35. Thus, the control ECU 30 implements the CPLT communications, PLC communications, and/or the like to instruct the vehicular charge-and-discharge device 92 to start discharge of the vehicular battery 93. Simultaneously, the control ECU 30 causes the storage battery ECU 14 to activate the relay device 15 in the power storage unit 10 thereby to activate the power converter (AC-DC converter) 13. In this way, the power converter 13 is caused to convert alternating-current electricity (alternating output) from the vehicle 90 into direct-current electricity, and the bidirectional power conditioner 11 is caused to discharge the converted direct-current electricity into the alternating-current power line 4.

In this way, alternating-current electricity from the vehicle 90 is converted into direct-current electricity, and the bidirectional power conditioner 11 is caused to discharge the converted direct-current electricity into the alternating-current power line 4. In the state of the present conversion and discharge, the storage battery ECU 14 monitors accumulation of electricity in the storage battery 12. Further, in this state, the storage battery ECU 14 obtains from the bidirectional power conditioner 11 information about whether a reverse power flow into the power system 2 through the alternating-current power line 4 occurs and monitors occurrence of the reverse power flow according to the information. Thus, the storage battery ECU 14 further controls an amount of electric discharge from the vehicle 90. When the storage battery 12 is caused to discharge electricity into the alternating-current power line 4, electricity discharged from the vehicular battery 93 is used, for example, to complement insufficiency of electric power supplied to an electric device connected to the alternating-current power line 4. For example, when accumulation of electricity in the storage battery 12 is sufficient to enable the storage battery 12 to supply electricity though the alternating-current power line 4 to the electric device connected to the alternating-current power line 4, the vehicular battery 93 is not caused to discharge electricity.

For example, when an operation switch device or the like is manipulated to cause the operation display unit 41 to transmit a discharge termination command through the LAN, the control ECU 30 implements the CPLT communications, the PLC communications, and/or the like to cause the vehicular charge-and-discharge device 92 to terminate the discharge operation. In this case, the control ECU 30 further deactivates the relay device 35 and activates the relay device 25. Thus, the control ECU 30 turns into a standby mode. Simultaneously, the control ECU 30 causes the storage battery ECU 14 to deactivate the relay device 15 in the power storage unit 10 thereby to deactivate the power converter 13 and to terminate the AC-DC conversion.

When the surplus accumulation of electricity is substantially empty, the vehicular charge-and-discharge device 92 detects the empty state according to the SOC state (state-of-charge state) of the vehicular battery 93 and transmits a discharge termination command to the control ECU 30. It is conceivable that the control ECU 30 receives the discharge termination command from the vehicular charge-and-discharge device 92 in a condition where the alternating output from the vehicle 90 is converted into direct-current electricity, and the bidirectional power conditioner 11 is caused to discharge the converted direct-current electricity into the alternating-current power line 4. In this case, the control ECU 30 implements the control operation as described above to terminate the discharge of electricity. In the present state, the control ECU 30 transmits information about accumulation of electricity in the vehicular battery 93 to the operation display unit 41 through the LAN. The operation display unit 41 may cause the display unit 42 to indicate that the vehicular battery 93 does not store surplus accumulation of electricity.

In the discharge mode, the control ECU 30 may automatically implement a control operation to cause the vehicular battery 93 of the vehicle 90 to discharge electricity into the alternating-current power line 4. Alternatively, a user or the like may operate a device to cause the vehicular battery 93 to discharge electricity into the alternating-current power line 4.

More specifically, for example, it is conceivable that the control ECU 30 determines that electric power supplied to an electric load is insufficient only with electricity discharged from the storage battery 12 into the alternating-current power line 4 and determines that the vehicular battery 93 stores surplus electricity, according to the information obtained from the vehicle 90. In this case, the control ECU 30 may cause the display unit 42 of the operation display unit 41 to indicate recommendation to cause the vehicular battery 93 to discharge electricity into the alternating-current power line 4. In this case, when the operation switch device 43 is manipulated to set a permission state to permit the vehicle 90 to output electricity, the vehicular battery 93 of the vehicle 90 may be caused to discharge electricity into the alternating-current power line 4.

With the present configuration, only when a user or the like desires use of surplus accumulation of electricity in the vehicular battery 93, the vehicular battery 93 is caused to discharge stable electricity into the alternating-current power line 4. Thus, excessive consumption of accumulation of electricity in the vehicular battery 93 can be restricted.

In addition, for example, it is conceivable that the control ECU 30 determines that electric power supplied to an electric load is insufficient only with electricity discharged from the storage battery 12 into the alternating-current power line 4 and determines that the vehicular battery 93 stores surplus electricity, according to the information obtained from the vehicle 90. In this case, the control ECU 30 may cause the display unit 42 of the operation display unit 41 to indicate to cause the vehicular battery 93 to discharge electricity into the alternating-current power line 4. Alternatively, the vehicular battery 93 of the vehicle 90 may be caused to discharge electricity into the alternating-current power line 4, irrespective of the existence of an operation of a user or the like.

With the present configuration, when electric power supply is insufficient only with electricity discharged from the storage battery 12 and when accumulation of electricity in the vehicular battery 93 has a margin, the vehicular battery 93 is caused to discharge stable electricity into the alternating-current power line 4. Thus, excessive consumption of accumulation of electricity in the vehicular battery 93 can be restricted.

It is conceivable when the storage battery 12 is not discharging electricity though the alternating-current power line 4, i.e., when the storage battery 12 is not needed to discharge electricity into the alternating-current power line 4, the control ECU 30 determines that the vehicular battery 93 stores surplus accumulation of electricity according to the information from the vehicle 90. In this case, the control ECU 30 may cause the storage battery 12 once to store electricity discharged from the vehicular battery 93 of the vehicle 90 through the discharge power line 31. Further, in this case, the control ECU 30 may cause the storage battery 12 to discharge electricity into the alternating-current power line 4 when necessary.

According to the above-described configuration and operation, the electric power supply system of the present embodiment is equipped with the power storage unit 10 including the storage battery 12. The storage battery 12 is connected with the alternating-current power line 4 through the bidirectional power conditioner 11. Thus, the storage battery 12 is enabled to be charged with electricity supplied through the alternating-current power line 4 and is enabled to discharge direct-current electricity stored therein into the alternating-current power line 4.

When charging the vehicular battery 93 of the vehicle 90, the control ECU 30 of the charge stand 20 is configured to charge the vehicular battery 93 with alternating-current electricity flowing through the alternating-current power line 4 and supplied through the charge power line 21 and the direct charge-and-discharge connector 23. Alternatively, when discharging the vehicular battery 93, the control ECU 30 of the charge stand 20 is configured to cause the vehicular battery 93 of the vehicle 90 to output alternating-current electricity through the charge-and-discharge connector 23 and the discharge power line 31 to the power storage unit 10. In this case, the power converter 13 converts the alternating-current electricity into direct-current electricity and the bidirectional power conditioner 11 discharges the converted direct-current electricity into the alternating-current power line 4.

With the present configuration, when the vehicular battery 93 discharges electricity, the power converter 13 once converts alternating-current electricity outputted from the vehicle 90 into direct-current electricity using the electricity supply system different from that when the vehicular battery 93 is charged with electricity. Furthermore, the converted direct-current electricity can be discharged into the alternating-current power line 4 through the bidirectional power conditioner 11, which is equipped to charge and discharge the storage battery 12.

The bidirectional power conditioner 11 may have a relatively high efficiency feature. In general, the bidirectional power conditioner 11 may be assigned with a qualification for use in a connection system with a commercial power system. With the present configuration including the bidirectional power conditioner 11, electricity discharged from the vehicular battery 93 to the alternating-current power line 4 can be stabilized, by utilizing the bidirectional power conditioner 11 for charging and discharging the storage battery 12 of the power storage unit 10. Thus, stable discharge of electricity can be implemented, without an additional highly efficient device for stabilizing electricity discharged through the charge power line 21 and without replacement of the vehicular charge-and-discharge device 92 to a highly efficient device. In this way, electricity discharged from the vehicular battery 93 of the vehicle 90 into the alternating-current power line 4 in the building 1 can be stabilized without provision of an additional complicated device.

In addition, an additional device, which is for stabilizing electricity discharged into the charge power line 21, need not be provided. Therefore, efficiency of electric charge can also be restricted from being impaired, due to such an additional device.

Second Embodiment

Figure 4:
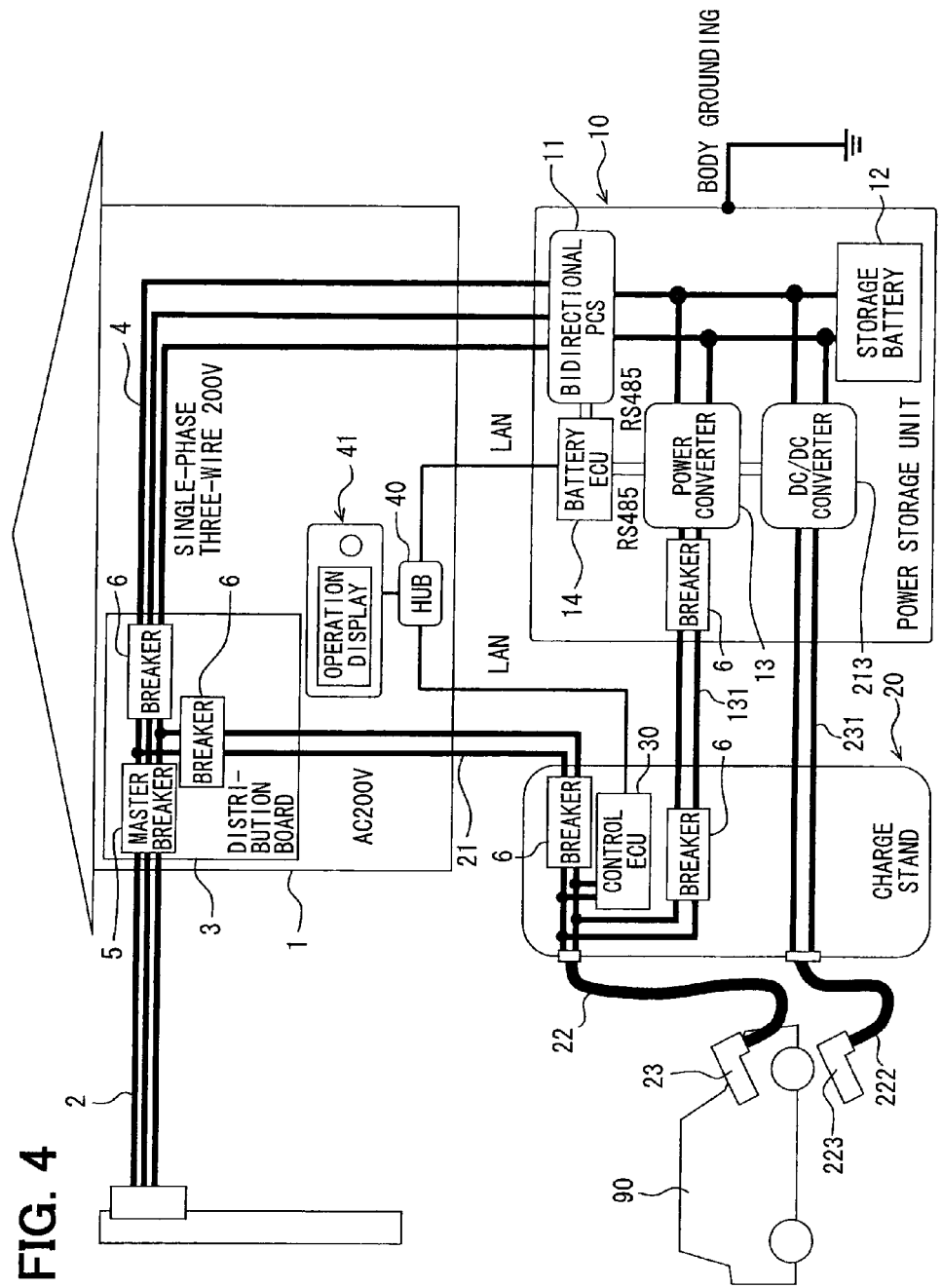
FIG. 4 is a schematic diagram showing an electric power supply system according to the second embodiment.

FIG. 4 is a schematic diagram showing an electric power supply system according to the second embodiment.

Figure 5:
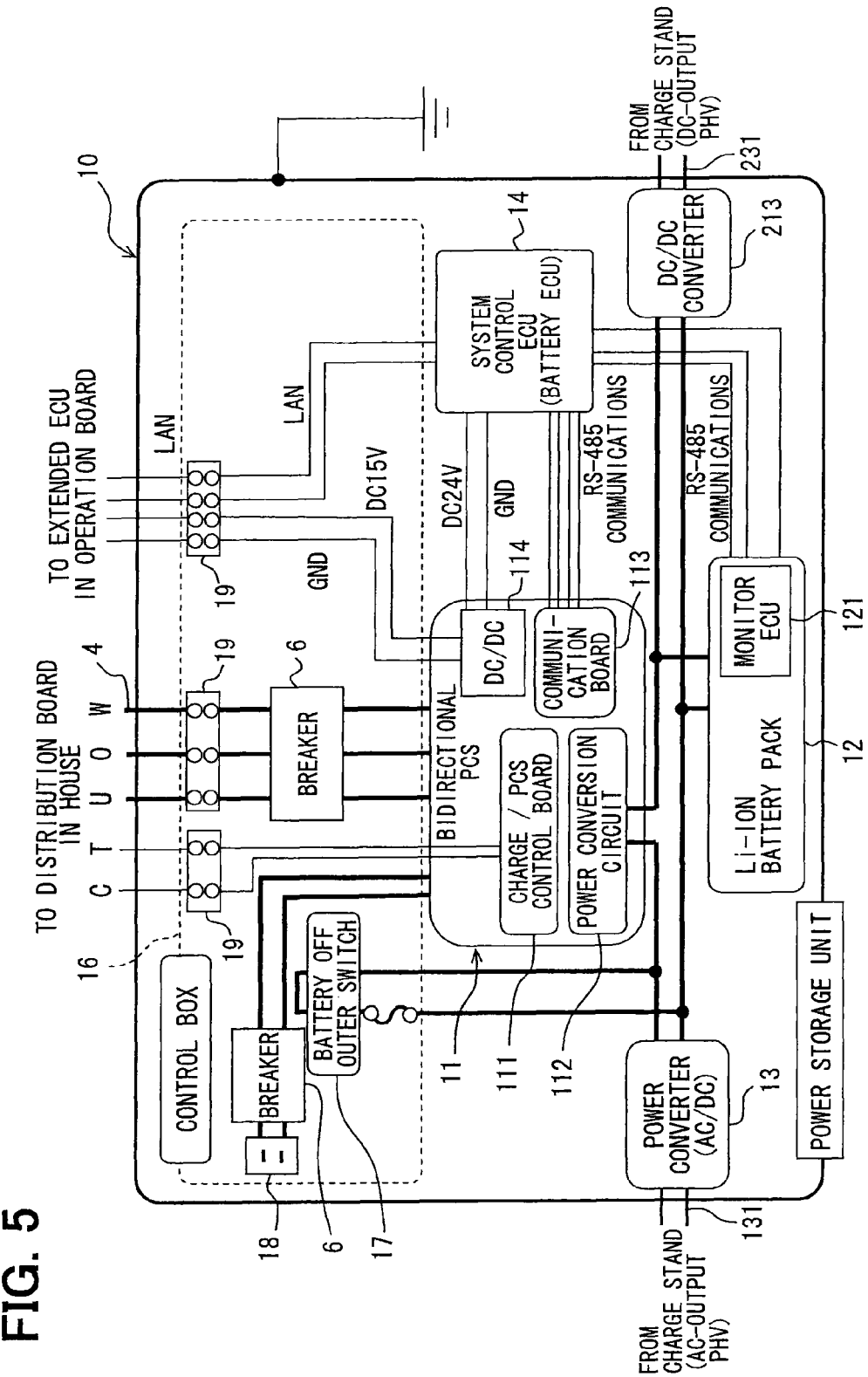
FIG. 5 is a schematic diagram showing an electric power storage unit for the electric power supply system, according to the second embodiment.

FIG. 5 is a schematic diagram showing an electric power storage unit 10 for the electric power supply system.

Figure 6:
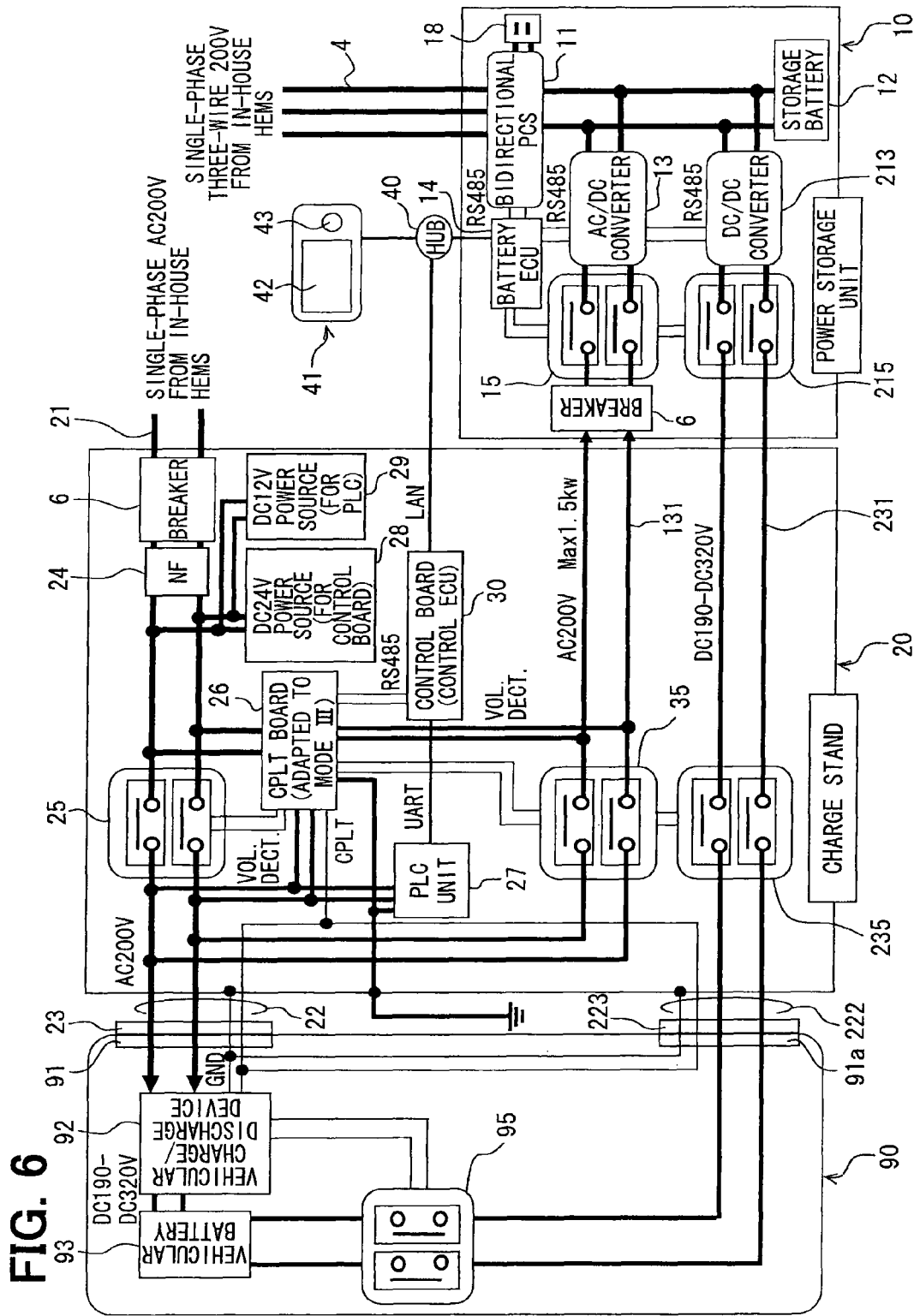
FIG. 6 is a schematic diagram showing an electric power storage unit and a charge stand for the electric power supply system, according to the second embodiment.

FIG. 6 is a schematic diagram showing an electric power storage unit 10 and a charge stand 20 for the electric power supply system.

As shown in FIG. 4, the electric power supply system of the present embodiment includes an alternating-current power line 4, a power storage unit 10, the charge stand 20, and an operation display unit 41. The alternating-current power line 4 is wired with a building 1 such as a residence. The power storage unit 10 is electrically connected with the alternating-current power line 4. The charge stand 20 is for supplying electricity fed from the alternating-current power line 4 to the vehicle 90 to charge a vehicular battery. The operation display unit 41 is connected with the power storage unit 10 and the charge stand 20 via a telecommunication cable. The vehicle 90 is, for example, an automobile, which is equipped with a power accumulating device with a relatively large capacity, such as a plug-in hybrid vehicle or an electric vehicle.

The alternating-current power line 4 wired in the building 1 is a power line such as a single-phase three-wire type power line including one neutral line and two voltage lines. The alternating-current power line 4 is supplied with a grid power from a power system 2 of an electric power company via a distribution board 3. The distribution board 3 is equipped with a master breaker 5 and a current breaker 6. The current breaker 6 has a short circuit detection function to regulate an upper limit of an electric current flowing into each circuit system. In FIG. 1, elements located out of the distribution board 3 and each denoted with the reference numeral 6 are also current breakers (short circuit breakers) having the short circuit detection function.

The alternating-current power line 4 may be further configured to receive external power such as natural energy (reusable energy) obtained at various power generation facilities. The external power may be sunlight energy, solar thermal energy, wind power energy, hydraulic power energy, and/or the like. The alternating-current power line 4 is connectable with various electric devices (electric load, not shown) and is configured to supply electric power to the electric devices.

The alternating-current power line 4 is connected with the power storage unit 10 (power storage system, e-Station). The power storage unit 10 is, for example, located outside the building 1. The power storage unit 10 includes a bidirectional power conditioner 11, a storage battery 12, a power converter 13, a storage battery ECU (storage battery control device) 14, a DC-DC converter 213, and the like. The storage battery 12 is, for example, an aggregate of combined multiple unit batteries each being a rechargeable battery such as a lithium ion battery.

As shown in FIG. 5, the bidirectional power conditioner (bidirectional PCS) 11 includes a charge and PCS control board 111, a power source conversion circuit 112, a communication board 113, and a DC-DC converter 114. The storage battery 12 is electrically connected with the alternating-current power line 4 through the bidirectional power conditioner 11. The storage battery 12 is configured to charge the alternating-current electricity supplied through the alternating-current power line 4 and to discharge direct-current electricity stored in the storage battery 12 into the alternating-current power line 4.

When the storage battery 12 is charged and is discharged, the power source conversion circuit 112 is configured to implement AC-DC conversion, to control the voltage, and to control charge-and-discharge electric power, according to a command of the charge and PCS control board 111 of the bidirectional power conditioner 11. The charge and PCS control board 111 is configured to receive a signal from an electric current sensor (not shown) through a joining terminal stand 19. The joining terminal stand 19 is located in a control box 16. The electric current sensor is equipped on the power line on the upstream side of the master breaker 5. When the storage battery 12 discharges electricity to the alternating-current power line 4, the charge and PCS control board 111 is configured to activate a relay device (not shown) to prohibit electric discharge on detection of adverse current flow to the power system 2 though the alternating-current power line 4 according to an input signal from the electric current sensor.

A power supply line is extended from the DC-DC converter 114 to the storage battery ECU 14 and the operation display unit 41 (refer to FIG. 4) thereby to enable activation of the storage battery ECU 14 and the operation display unit 41 in a state of power failure of the grid power of the power system 2.

As shown in FIG. 4 and FIG. 5, the storage battery ECU 14 is connected with the bidirectional power conditioner 11, the storage battery 12, the power converter 13, and the DC-DC converter 213 via a communication line. In the present configuration, the storage battery ECU 14 is configured to control operation of the bidirectional power conditioner 11, operation of the storage battery 12, operation of the power converter 13, and operation of the DC-DC converter 213 by implementing communications in compliance with a telecommunications standard such as RS-485. Specifically, as shown in FIG. 5, the storage battery ECU 14 is connected communicably with the communication board 113 of the bidirectional power conditioner 11. The storage battery ECU 14 is further connected communicably with a storage battery monitor ECU (storage battery monitor unit) 121 equipped in the storage battery 12.

Referring to FIG. 4, the storage battery ECU 14 is connected with the operation display unit 41 and the control ECU 30 of the charge stand 20 though a hub 40 and is communicated with each other via the LAN (local area network) thereby enabled to implement mutual information exchange (communication of information) thereamong. Referring to FIG. 5, the LAN cable is extended from the storage battery ECU 14. The LAN cable and the power supply line, which is extended from the DC-DC converter 114, are extended to the joining terminal stand 19 in the control box 16. The LAN cable and the power supply line from the DC-DC converter 114 are further extended out of the power storage unit 10 and are connected with to an extended ECU located in the operation display unit 41.

The control box 16 accommodates the joining terminal stand 19, a battery OFF outer switch device 17, a direct-current fuse, a standard-type electric socket 18, and the like. The joining terminal stand 19 is for connecting the alternating-current power line 4 extended from the building 1 with an internal wiring of the power storage unit 10. The battery OFF outer switch device 17 opens and closes the charge-and-discharge system of the storage battery 12. The direct-current fuse is equipped in the charge-and-discharge system of the storage battery 12. The standard-type electric socket 18 is for 100V system.

The bidirectional power conditioner 11 may be equivalent to a bidirectional power converter bilaterally convertible between alternating-current electricity and direct-current electricity in the present embodiment. The storage battery 12 may be equivalent to a power storage unit of the present embodiment. The power storage unit is connected with the alternating-current power line 4 through the bidirectional power converter and is configured to be charged with electricity supplied through the alternating-current power line 4. The power storage unit is further configured to discharge direct-current electricity into the alternating-current power line 4.

Referring to FIG. 4, the charge stand 20 is, for example, provided outside the building 1 separately from the power storage unit 10. The charge stand 20 is connected with a charge power line 21 branched at the distribution board 3 from the alternating-current power line 4. The charge power line 21 is extended to the inside of the charge stand 20 and is connected with a charge-and-discharge cable 22 extended outside from the body of the charge stand 20. The tip end of the charge-and-discharge cable 22 is connected with a charge-and-discharge connector 23 (first connection terminal portion).

The charge power line 21 is branched from an AC discharge power line (alternating current discharge power line) 31 in the body of the charge stand 20. The AC discharge power line 131 is extended outside from the body of the charge stand 20 into the power storage unit 10. The AC discharge power line 131 located in the power storage unit 10 is connected with the storage battery 12 in parallel with a power line, which connects the bidirectional power conditioner 11 with the storage battery 12.

The charge stand 20 is equipped with a discharge cable 222 extended outward from the body of the charge stand 20. The tip end of the discharge cable 222 is connected with a discharge connector 223 (second connection terminal portion).

In the body of the charge stand 20, the DC discharge power line (direct-current discharge power line) 231 is connected with the discharge cable 222. The DC discharge power line 231 is extended outward from the inside of the body of the charge stand 20 and is further extended into the power storage unit 10. The DC discharge power line 231 located in the power storage unit 10 is connected with the storage battery 12 in parallel with a power line, which connects the bidirectional power conditioner 11 with the storage battery 12.

As shown in FIG. 6, the breaker 6, a noise filter 24, and a relay device 25 are interposed in the charge power line 21 pulled into the charge stand 20. The breaker 6, the noise filter 24, and the relay device 25 are arranged in order from the upstream side and located on the upstream side of the connection point with the AC discharge power line 131 in the direction of power supply. A relay device 35 is interposed in the AC discharge power line 131 pulled into the charge stand 20. The breaker 6, a relay device 15, and the power converter (AC-DC converter) 13 are interposed in the AC discharge power line 131 pulled into the power storage unit 10 and are arranged in order from the upstream side of the electricity supply. The relay devices 15, 25, and 35 are configured to open and close an electric circuit according to an electric signal. In the present example, each of the relay devices 15, 25, and 35 has a configuration to connect and disconnect two circuits therein.

A relay device 235 is interposed in a DC discharge power line 231 pulled into the charge stand 20. A relay device 215 and the DC-DC converter 213 are interposed in the DC discharge power line 231 pulled into the power storage unit 10 and are arranged in order from the upstream side of the electricity supply. The relay devices 215 and 235 are configured to open and close an electric circuit according to an electric signal. In the present example, each of the relay devices 215 and 235 has a configuration to connect and disconnect two circuits therein.

The charge stand 20 accommodates a CPLT board 26, a PLC unit 27, a control ECU (control board) 30, an electric power unit 28 for the control board, and an electric power unit 29 for the PLC unit.

The CPLT board 26 is configured to output an opening-and-closing actuating signal of the relay devices 25, 35, and 235, to detect the voltage of the charge power line 21 in the downstream of the relay device 25, and to detect the voltage of the AC discharge power line 131 on the downstream side of the relay device 35. The CPLT board 26 is further configured to generate a CPLT signal (control pilot signal) and to output the generated CPLT signal thereby to exchange signals with a vehicular charge-and-discharge device 92 equipped on the vehicle 90. The CPLT board 26 has a main configuration to control charge of the vehicular battery 93.

FIG. 6 shows a CPLT line and a GND line together with the power line contained in the charge-and-discharge cable 22 and configured to conduct the CPLT signal. The CPLT line and the GND line together with the power line are also contained in a discharge cable 222 and configured to conduct the CPLT signal. The CPLT board 26 is supplied with electricity through the charge power line 21 on the upstream side of the relay device 25 thereby being activated. The CPLT board 26 is communicable with the control ECU 30 by implementing communications in compliance with a telecommunications standard such as RS-485.

The PLC (power line communication) unit 27 is configured to implement communications with the vehicle 90 through the power line in the charge-and-discharge cable 22. The PLC unit 27 is supplied with electricity from the DC power unit 29 connected with the charge power line 21 on the upstream side of the relay device 25 thereby being activated. The PLC unit 27 is communicable with the control ECU 30 by implementing, for example, UART (universal asynchronous reception and transmission), which is for implementing asynchronous serial communications.

The vehicle 90 is equipped with, for example, a connector 91, which is a slot of the charge-and-discharge connector 23. The charge-and-discharge connector 23 of the charge stand 20 is connected to the connector 91 thereby to enable charge and discharge of the vehicular battery 93 via the vehicular charge-and-discharge device 92. When the vehicular battery 93 is charged with electricity, the connector 91 is supplied with alternating-current electricity, and the vehicular charge-and-discharge device 92 converts the supplied alternating-current electricity into direct-current electricity thereby to charge the vehicular battery 93 with the converted direct-current electricity. Alternatively, when the vehicular battery 93 discharges electricity, the vehicular charge-and-discharge device 92 converts direct-current electricity stored in the vehicular battery 93 into alternating-current electricity, and the converted alternating-current electricity is discharged to the charge-and-discharge connector 23 through the connector 91.

The vehicle 90 is equipped with, for example, a connector 91a, which is a slot of the discharge connector 223. Discharging of electricity from the vehicular battery 93 is enabled by connecting the connector 91a with the discharge connector 223 of the charge stand 20. The vehicular battery 93 discharges direct-current electricity, which is stored in the vehicular battery 93, through the connector 91a and the discharge connector 223 without DC-AC conversion.

The control ECU 30 is supplied with electricity from the DC power unit 28 connected to the charge power line 21 on the upstream side of the relay device 25 thereby being activated. The control ECU 30 implements communications with the CPLT board 26, the PLC unit 27, the storage battery ECU 14, and the operation display unit 41, thereby to control charge and discharge of the vehicular battery 93 which functions as a vehicular power accumulating device. The control ECU 30 may be equivalent to an electric charge control unit for the vehicular power accumulating device and may be also equivalent to a discharge control unit for the vehicular power accumulating device. That is, the control ECU 30 may be equivalent to an electric charge and discharge control unit for the vehicular power accumulating device.

The operation display unit 41 is a remote operation unit (remote controller) provided in, for example, the building 1. The operation display unit 41 includes a display unit 42 and an operation switch device 43. The display unit 42 may be equivalent to an announcement unit. The operation switch device 43 may be equivalent to a permission state setting unit configured to set the output state of electricity from the vehicle 90 into a permission state. The announcement unit is not limited to an indication unit such as the display unit 42 and may be another device such as a sounding unit. The announcement unit may be a combination with another device.

The configuration including the charge stand 20, which includes the charge-and-discharge cable 22 and the charge-and-discharge connector 23, the charge power line 21, the hub 40, the operation display unit 41, the relay device 15, the power converter 13 including the AC discharge power line 131, and the storage battery ECU 14 may be equivalent to an AC charge-and-discharge unit of the present embodiment.

The configuration including the charge stand 20, which includes the discharge cable 222 and the discharge connector 223, the DC discharge power line 231, the hub 40, the operation display unit 41, the relay device 215, the DC-DC converter 213, and the storage battery ECU 14 may be equivalent to a DC discharge unit of the present embodiment.

The DC discharge power line 231 may be equipped with a safety device such as a regulating unit for regulating an upper limit to a flowing electric current.

As follows, an example of operation of the electric power supply system with the above-described configuration will be described.

In a charge mode where the vehicular battery 93 is charged with electricity, the control ECU 30 first confirms whether the charge-and-discharge connector 23 is connected to the vehicle 90 via the CPLT communications or the like. The control ECU 30 further transmits information about completion of the connection to the operation display unit 41 in the house through the LAN, when the charge-and-discharge connector 23 is connected to the vehicle 90. The transmission may be implemented, specifically, via the CPLT communications and/or the RS-485 communications through the CPLT board 26. The operation display unit 41 may cause the display unit 42 to indicate the completion of the connection.

Subsequently, the control ECU 30 deactivates the relay devices 25 and 35 and confirms whether each output of the relay devices 25 and 35 is not applied with voltage thereby to detect whether welding is not caused in each output of the relay devices 25 and 35. Thereafter, the control ECU 30 activates the relay device 25 and starts the PLC communications. The control ECU 30 implements the PLC communications (the PLC communications and the UART communications through the PLC unit 27) and/or the like to transmit detected information about the vehicle 90 to the operation display unit 41 through the LAN. The operation display unit 41 may cause the display unit 42 to indicate the vehicular information.

When being in the charge mode, the control ECU 30 regularly deactivates the relay device 95 and the devices 235 and 215 each interposed in the direct-current discharge power line in the vehicle 90 and each having, for example, the configuration to connect and disconnect two circuits therein, when confirming that the charge-and-discharge connector 23 has been connected to the vehicle 90 according to information obtained though the CPLT communication and/or the like.

For example, when an operation switch device or the like is manipulated to cause the operation display unit 41 to transmit a charge start command through the LAN, the control ECU 30 activates the relay device 25 and deactivates the relay device 35. Thus, the control ECU 30 implements the CPLT communications and/or the like to instruct the vehicular charge-and-discharge device 92 to start charging with specified electricity.

When the control ECU 30 detects end of charge of the vehicular battery 93 on reception of the CPLT signal and/or the like, the control ECU 30 transmits charge end information to the operation display unit 41 through the LAN. Thus, the control ECU 30 turns into a standby mode. The operation display unit 41 may cause the display unit 42 to indicate the charge end information.

For example, when an operation switch device or the like is manipulated to cause the operation display unit 41 to transmit a charge termination command through the LAN, the control ECU 30 implements the CPLT communications and/or the like to cause the vehicular charge-and-discharge device 92 to terminate the charge operation. Thus, the control ECU 30 turns into a standby mode.

On confirmation that the charge-and-discharge connector 23 is detached from the vehicle 90 via the CPLT communications and/or the like, the control ECU 30 deactivates the relay device 25 and transmits information about detachment of the charge-and-discharge connector 23 to the operation display unit 41 through the LAN. The operation display unit 41 may cause the display unit 42 to indicate the information about detachment of the charge-and-discharge connector 23.

Subsequently, the discharge mode where the vehicular battery 93 discharges electricity will be described.

When the charge-and-discharge connector 23 is connected to the connector 91 of the vehicle 90 and when the discharge connector 223 is not connected to the vehicle 90, the control ECU 30 causes the vehicular charge-and-discharge device 92 to convert direct-current electricity of the vehicular battery 93 into alternating-current electricity and to discharge the converted alternating-current electricity. Alternatively, when the charge-and-discharge connector 23 is connected to the connector 91 of the vehicle 90 and when the discharge connector 223 is connected to the connector 91a of the vehicle 90, the control ECU 30 causes the vehicular battery 93 to discharge direct-current electricity without DC-AC conversion.

Alternatively, in an AC discharge mode where electricity of the vehicular battery 93 of the vehicle 90 is discharged as alternating-current electricity, the control ECU 30 first confirms whether the charge-and-discharge connector 23 is connected to the vehicle 90 via the CPLT communications or the like. The control ECU 30 further transmits information about completion of the connection to the operation display unit 41 through the LAN, when the charge-and-discharge connector 23 is connected to the vehicle 90. The transmission may be implemented, specifically, via the CPLT communications and/or the RS-485 communications through the CPLT board 26. The operation display unit 41 may cause the display unit 42 to indicate the completion of the connection.

Subsequently, the control ECU 30 deactivates the relay devices 25 and 35 and confirms whether each output of the relay devices 25 and 35 is not applied with voltage thereby to detect whether welding is not caused in each output of the relay devices 25 and 35. Thereafter, the control ECU 30 activates the relay device 25 and starts the PLC communications. The control ECU 30 implements the PLC communications (the PLC communications and the UART communications through the PLC unit 27) and/or the like to transmit detected information about the vehicle 90 to the operation display unit 41 through the LAN. The operation display unit 41 may cause the display unit 42 to indicate the vehicular information. For example, the display unit 42 is caused to indicate whether the vehicular battery 93 of the vehicle 90 has a surplus accumulation of electricity exceeding an accumulation of electricity required for a subsequent vehicle traveling operation.

For example, when the vehicular battery 93 of the vehicle 90 has a surplus accumulation of electricity and when, for example, the operation switch device 43 is manipulated to cause the operation display unit 41 to transmit a discharge start command through the LAN, the control ECU 30 deactivates the relay device 25 and activates the relay device 35. Thus, the control ECU 30 implements the CPLT communications, PLC communications, and/or the like to instruct the vehicular charge-and-discharge device 92 to start discharge of the vehicular battery 93. Simultaneously, the control ECU 30 causes the storage battery ECU 14 to activate the relay device 15 in the power storage unit 10 thereby to activate the power converter (AC-DC converter) 13. In this way, the power converter 13 is caused to convert alternating-current electricity (alternating output) from the vehicle 90 into direct-current electricity, and the bidirectional power conditioner 11 is caused to discharge the converted direct-current electricity into the alternating-current power line 4.

In this way, alternating-current electricity from the vehicle 90 is converted into direct-current electricity, and the bidirectional power conditioner 11 is caused to discharge the converted direct-current electricity into the alternating-current power line 4. In the state of the present conversion and discharge, the storage battery ECU 14 monitors accumulation of electricity in the storage battery 12. Further, in this state, the storage battery ECU 14 obtains from the bidirectional power conditioner 11 information about whether a reverse power flow into the power system 2 through the alternating-current power line 4 occurs and monitors occurrence of the reverse power flow according to the information. Thus, the storage battery ECU 14 further controls an amount of electric discharge from the vehicle 90. When the storage battery 12 is caused to discharge electricity into the alternating-current power line 4, electricity discharged from the vehicular battery 93 is used, for example, to complement insufficiency of electric power supplied to an electric device connected to the alternating-current power line 4. For example, when accumulation of electricity in the storage battery 12 is sufficient to enable the storage battery 12 to supply electricity though the alternating-current power line 4 to the electric device connected to the alternating-current power line 4, the vehicular battery 93 is not caused to discharge electricity.

For example, when an operation switch device or the like is manipulated to cause the operation display unit 41 to transmit a discharge termination command through the LAN, the control ECU 30 implements the CPLT communications, the PLC communications, and/or the like to cause the vehicular charge-and-discharge device 92 to terminate the discharge operation. In this case, the control ECU 30 further deactivates the relay device 35 and activates the relay device 25. Thus, the control ECU 30 turns into a standby mode. Simultaneously, the control ECU 30 causes the storage battery ECU 14 to deactivate the relay device 15 in the power storage unit 10 thereby to deactivate the power converter 13 and to terminate the AC-DC conversion.

When the surplus accumulation of electricity is substantially empty, the vehicular charge-and-discharge device 92 detects the empty state according to the SOC state (state-of-charge state) of the vehicular battery 93 and transmits a discharge termination command to the control ECU 30. It is conceivable that the control ECU 30 receives the discharge termination command from the vehicular charge-and-discharge device 92 in a condition where the alternating output from the vehicle 90 is converted into direct-current electricity, and the bidirectional power conditioner 11 is caused to discharge the converted direct-current electricity into the alternating-current power line 4. In this case, the control ECU 30 implements the control operation as described above to terminate the discharge of electricity. In the present state, the control ECU 30 transmits information about accumulation of electricity in the vehicular battery 93 to the operation display unit 41 through the LAN. The operation display unit 41 may cause the display unit 42 to indicate that the vehicular battery 93 does not store surplus accumulation of electricity.

Alternatively, in a DC discharge mode where electricity of the vehicular battery 93 of the vehicle 90 is discharged as direct-current electricity, the control ECU 30 first confirms whether the discharge connector 223 is connected to the vehicle 90 via the CPLT communications or the like. The control ECU 30 further transmits information about completion of the connection to the operation display unit 41 through the LAN, when the discharge connector 223 is connected to the vehicle 90. The transmission may be implemented, specifically, via the CPLT communications and/or the RS-485 communications through the CPLT board 26. The operation display unit 41 may cause the display unit 42 to indicate the completion of the connection.

Subsequently, the control ECU 30 deactivates the relay devices 25 and 35 and confirms whether each output of the relay devices 25 and 35 is not applied with voltage thereby to detect whether welding is not caused in each output of the relay devices 25 and 35. Thereafter, the control ECU 30 activates the relay device 25 and starts the PLC communications. The control ECU 30 implements the PLC communications (the PLC communications and the UART communications through the PLC unit 27) and/or the like to transmit detected information about the vehicle 90 to the operation display unit 41 through the LAN. The operation display unit 41 may cause the display unit 42 to indicate the vehicular information. For example, the display unit 42 is caused to indicate whether the vehicular battery 93 of the vehicle 90 has a surplus accumulation of electricity exceeding an accumulation of electricity required for a subsequent vehicle traveling operation.

For example, when the vehicular battery 93 of the vehicle 90 has a surplus accumulation of electricity and when, for example, the operation switch device 43 is manipulated to cause the operation display unit 41 to transmit a discharge start command through the LAN, the control ECU 30 deactivates the relay devices 25 and 35. The control ECU 30 further implements the CPLT communications, PLC communications, and/or the like to activate the relay device 95. Immediately after that, the control ECU 30 further activates the relay device 235 to cause the vehicular battery 93 to supply direct-current electricity into the DC discharge power line 231.

Simultaneously, the control ECU 30 causes the storage battery ECU 14 to activate the relay device 215 in the power storage unit 10 thereby to activate the DC-DC converter 213.

The DC-DC converter 213 is caused to regulate (increase and decrease) the voltage of the electricity from the vehicle 90, and the bidirectional power conditioner 11 is caused to discharge the voltage-regulated electricity into the alternating-current power line 4.

In this way, the bidirectional power conditioner 11 is caused to discharge the voltage-regulated converted direct-current electricity into the alternating-current power line 4. In the state of the present discharge, the storage battery ECU 14 monitors accumulation of electricity in the storage battery 12. Further, in this state, the storage battery ECU 14 obtains from the bidirectional power conditioner 11 information about whether a reverse power flow into the power system 2 through the alternating-current power line 4 occurs and monitors occurrence of the reverse power flow according to the information. Thus, the storage battery ECU 14 further controls an amount of electric discharge from the vehicle 90. When the storage battery 12 is caused to discharge electricity into the alternating-current power line 4, electricity discharged from the vehicular battery 93 is used, for example, to complement insufficiency of electric power supplied to an electric device connected to the alternating-current power line 4. For example, when accumulation of electricity in the storage battery 12 is sufficient to enable the storage battery 12 to supply electricity though the alternating-current power line 4 to the electric device connected to the alternating-current power line 4, the vehicular battery 93 is not caused to discharge electricity.

For example, when an operation switch device and/or the like is manipulated to cause the operation display unit 41 to transmit a command to terminate electric discharge through the LAN, the control ECU 30 deactivate the DC-DC converter 213 to terminate electricity supply into the DC discharge power line 231. The control ECU 30 further deactivates the relay devices 95, 235, and 215. The present operation to deactivate the relay devices 95, 235, and 215, after the termination of the operation of the DC-DC converter 213 to stop electricity supply, is to avoid welding in a contact of each relay device.

When the surplus accumulation of electricity is substantially empty, the vehicular charge-and-discharge device 92 detects the empty state according to the SOC state (state-of-charge state) of the vehicular battery 93 and transmits a discharge termination command to the control ECU 30. It is conceivable that the control ECU 30 receives the discharge termination command from the vehicular charge-and-discharge device 92 in a condition where the bidirectional power conditioner 11 is caused to discharge direct-current electricity from the vehicle 90 into the alternating-current power line 4. In this case, the control ECU 30 implements the control operation as described above to terminate the discharge of electricity. In the present state, the control ECU 30 transmits information about accumulation of electricity in the vehicular battery 93 to the operation display unit 41 through the LAN. The operation display unit 41 may cause the display unit 42 to indicate that the vehicular battery 93 does not store surplus accumulation of electricity.

In the AC discharge mode and the DC discharge mode, the control ECU 30 may automatically implement a control operation to cause the vehicular battery 93 of the vehicle 90 to discharge electricity into the alternating-current power line 4. Alternatively, a user or the like may operate a device to cause the vehicular battery 93 to discharge electricity into the alternating-current power line 4.

More specifically, for example, it is conceivable that the control ECU 30 determines that electric power supplied to an electric load is insufficient only with electricity discharged from the storage battery 12 into the alternating-current power line 4 and determines that the vehicular battery 93 stores surplus electricity, according to the information obtained from the vehicle 90. In this case, the control ECU 30 may cause the display unit 42 of the operation display unit 41 to indicate recommendation to cause the vehicular battery 93 to discharge electricity into the alternating-current power line 4. In this case, when the operation switch device 43 is manipulated to set a permission state to permit the vehicle 90 to output electricity, the vehicular battery 93 of the vehicle 90 may be caused to discharge electricity into the alternating-current power line 4.

With the present configuration, only when a user or the like desires use of surplus accumulation of electricity in the vehicular battery 93, the vehicular battery 93 is caused to discharge stable electricity into the alternating-current power line 4. Thus, excessive consumption of accumulation of electricity in the vehicular battery 93 can be restricted.

In addition, for example, it is conceivable that the control ECU 30 determines that electric power supplied to an electric load is insufficient only with electricity discharged from the storage battery 12 into the alternating-current power line 4 and determines that the vehicular battery 93 stores surplus electricity, according to the information obtained from the vehicle 90. In this case, the control ECU 30 may cause the display unit 42 of the operation display unit 41 to indicate to cause the vehicular battery 93 to discharge electricity into the alternating-current power line 4. Alternatively, the vehicular battery 93 of the vehicle 90 may be caused to discharge electricity into the alternating-current power line 4, irrespective of the existence of an operation of a user or the like.

With the present configuration, when electric power supply is insufficient only with electricity discharged from the storage battery 12 and when accumulation of electricity in the vehicular battery 93 has a margin, the vehicular battery 93 is caused to discharge stable electricity into the alternating-current power line 4. Thus, excessive consumption of accumulation of electricity in the vehicular battery 93 can be restricted.

It is conceivable when the storage battery 12 is not discharging electricity into the alternating-current power line 4, i.e., when the storage battery 12 is not needed to discharge electricity into the alternating-current power line 4, the control ECU 30 determines that the vehicular battery 93 stores surplus accumulation of electricity according to the information from the vehicle 90. In this case, the control ECU 30 may cause the storage battery 12 once to store electricity discharged from the vehicular battery 93 of the vehicle 90 into the AC discharge power line 131. Further, in this case, the control ECU 30 may cause the storage battery 12 to discharge electricity into the alternating-current power line 4 when necessary.

In the above description of the discharge mode, when the charge-and-discharge connector 23 is connected to the vehicle 90 and when the discharge connector 223 is not connected to the vehicle 90, the control ECU 30 sets the AC discharge mode. In addition, when both the charge-and-discharge connector 23 and the discharge connector 223 are connected to the vehicle 90, the control ECU 30 sets the DC discharge mode.

Alternatively, when the charge-and-discharge connector 23 is not connected to the vehicle 90 and when the discharge connector 223 is connected to the vehicle 90, the control ECU 30 sets the DC discharge mode. In this case, it is impossible to implement communications between the charge stand 20 and the vehicle 90 through the charge-and-discharge connector 23. Therefore, in this case, the control ECU 30 implements the CPLT communication through the discharge cable 222 and the discharge connector 223.

The control ECU 30 detects the connected state of the charge-and-discharge connector 23 to the vehicle 90 for conducting alternating current and the connected state of the discharge connector 223 to the vehicle 90 for conducting direct current. The control ECU 30 further switches the AC discharge mode and the DC discharge mode selectively according to the detected connected state.

In the above-described embodiment, the charge-and-discharge connector 23 and the discharge connector 223 are provided separately. It is noted that, both the charge-and-discharge connector 23 and the discharge connector 223 may be formed integrally and may be connected with the vehicle. That is, the first connecting terminal portion and the second connecting terminal portion may be integrated. In the present configuration, the charge-and-discharge connector includes both the first connecting terminal portion and the second connecting terminal portion being integrated into one connector device. In this case, the above-described electric discharge operation, in the case where the charge-and-discharge connector 23 is connected to the connector 91 of the vehicle 90, and the discharge connector 223 is connected to the connector 91a of the vehicle 90, is implemented.

In the above-described embodiment, the DC discharge power line 231 is employed to discharge direct-current electricity of the vehicular battery 93. It is noted that, the storage battery 12 may be caused to discharge direct-current electricity through this electricity supply system (DC discharge power line 231) to the vehicular battery 93 thereby to charge the vehicular battery 93. In addition, the bidirectional power conditioner 11 may be caused to convert alternating-current electricity flowing through the alternating-current power line 4 into direct-current electricity, and the converted direct-current electricity may be supplied to the vehicular battery 93 to charge the vehicular battery 93.

According to the above-described configuration and operation, the electric power supply system of the present embodiment is equipped with the power storage unit 10 including the storage battery 12. The storage battery 12 is connected with the alternating-current power line 4 through the bidirectional power conditioner 11. Thus, the storage battery 12 is enabled to be charged with electricity supplied through the alternating-current power line 4 and is enabled to discharge direct-current electricity stored therein through the alternating-current power line 4.

In addition, when the vehicular battery 93 of the vehicle 90 is charged with electricity, the control ECU 30 of the charge stand 20 causes alternating-current electricity flowing through the alternating-current power line 4 to be supplied to the direct charge-and-discharge connector 23 through the charge power line 21 thereby to charge the vehicular battery 93 with electricity.

When the vehicular battery 93 of the vehicle 90 is caused to discharge alternating-current electricity through the charge-and-discharge connector 23 and the AC discharge power line 131 to the power storage unit 10, the power converter 13 is caused to convert the supplied electricity into direct-current electricity. Further, the bidirectional power conditioner 11 is caused to discharge the converted direct-current electricity into the alternating-current power line 4.

Alternatively, when the vehicular battery 93 of the vehicle 90 is caused to discharge direct-current electricity through the discharge connector 223 and the DC discharge power line 231 to the power storage unit 10, the DC-DC converter 213 is caused to regulate the voltage of the supplied direct-current electricity. Further, the bidirectional power conditioner 11 is caused to discharge the voltage-regulated direct-current electricity into the alternating-current power line 4.

With the present configuration, the vehicular battery 93 is enabled to discharge electricity into the alternating-current power line 4 by using the electricity supply system through the bidirectional power conditioner 11, which is provided for charge and discharge of the storage battery 12. That is, the vehicular battery 93 is enabled to discharge electricity into the alternating-current power line 4 by using the electricity supply system different from the electricity supply system in the case where the vehicular battery 93 is charged with electricity. When alternating-current electricity is outputted from the vehicle 90, the power converter 13 is once caused to convert the outputted alternating-current electricity into direct-current electricity, and the bidirectional power conditioner 11 is caused to discharge the converted direct-current electricity into the alternating-current power line 4. Alternatively, when direct-current electricity is outputted from the vehicle 90, the bidirectional power conditioner 11 is caused to discharge the outputted direct-current electricity into the alternating-current power line 4.

The bidirectional power conditioner 11 may have a relatively high efficiency feature. In general, the bidirectional power conditioner 11 may be assigned with a qualification for use in a connection system with a commercial power system. With the present configuration including the bidirectional power conditioner 11, electricity discharged from the vehicular battery 93 to the alternating-current power line 4 can be stabilized, by utilizing the bidirectional power conditioner 11 for charging and discharging the storage battery 12 of the power storage unit 10. Thus, stable discharge of electricity can be implemented, without an additional highly efficient device for stabilizing electricity discharged through the charge power line 21 and without replacement of the vehicular charge-and-discharge device 92 to a highly efficient device. In this way, electricity discharged from the vehicular battery 93 of the vehicle 90 into the alternating-current power line 4 in the building 1 can be stabilized without provision of an additional complicated device.

In addition, an additional device, which is for stabilizing electricity discharged into the charge power line 21, need not be provided. Therefore, efficiency of electric charge can also be restricted from being impaired, due to such an additional device.

Furthermore, when the vehicular battery 93 of the vehicle 90 outputs direct-current electricity, only the bidirectional power conditioner 11 is subjected to implement DC-AC conversion of the electricity discharged into the alternating-current power line 4. Therefore, reduction in efficiency due to DC-AC conversion can be restrained steadily.

Other Embodiment

As described above, the embodiments of the present invention have been mentioned. It is noted that the present invention is not limited to the above embodiments. The present invention may be variously modified and may be in practical use in a spirit of the present invention.

In the above embodiments, the LAN communications, the RS-485 communications, the UART communications, the PLC communications, and the CPLT communications are employed for exchanging information among the devices. It is noted that, the communications are not limited to the above-exemplified communications, and another communications may be employed in addition or in combination. The communications are not limited to the above-exemplified wired communications, and wireless communications may be employed in addition or in combination.

In the above embodiments, the power storage unit 10 and the charge stand 20 are separated from each other. It is noted that the power storage unit 10 and the charge stand 20 may be integrated into one device. When the power storage unit 10 and the charge stand 20 are separated devices, installation of these devices can be determined flexibly. Alternatively, when the power storage unit 10 and the charge stand 20 are integrated into one device, the total configuration of the device can be simplified.

In the above embodiments, each of the storage battery 12 being a stationary facility and the vehicular battery 93 is a rechargeable battery. The configuration of the storage battery 12 and the vehicular battery 93 is not limited to the above embodiments. Each of the storage battery 12 and the vehicular battery 93 may be a power storage unit, configured to be charged with electricity and to discharge electricity, such as a capacitor.

In the above embodiments, the building 1 is a residence. It is noted that, the building 1 is not limited to a residence. The building 1 may be, for example, a store, a factory, a warehouse, and/or the like.

The electric power supply system includes: an alternating-current power line (4) wired in a building (1) and connected to an electric load for supplying alternating-current electric power to the electric load; a bidirectional power converter (11) configured to convert bilaterally between an alternating-current electricity and a direct-current electricity; a power storage unit (12) connected to the alternating-current power line (4) through the bidirectional power converter (11) and configured to: be charged with an electricity from the alternating-current power line (4); and discharge a direct-current electricity stored in the power storage unit (12) into the alternating-current power line (4); a charge-and-discharge unit (13, 20, 41) equipped with a connecting terminal portion (23) connectable with a vehicle (90) and configured to: charge a vehicular power accumulating device (93) equipped in the vehicle (90) with an alternating-current electricity supplied from the alternating-current power line (4) through the connecting terminal portion (23); and discharge alternating-current electricity from the vehicular power accumulating device (93) through the connecting terminal portion (23). The charge-and-discharge unit (13, 20, 41) includes a power converter (13) configured to convert an alternating-current electricity outputted from the vehicle (90) through the connecting terminal portion (23) into a direct-current electricity, and the charge-and-discharge unit (13, 20, 41) is configured to discharge a direct-current electricity converted with the power converter (13) through the bidirectional power converter (11) into the alternating-current power line (4).

With the present configuration, when the vehicular power accumulating device (93) equipped in the vehicle (90) is charged, the charge-and-discharge unit (13, 20, 41) is configured to supply alternating-current electricity of the alternating-current power line (4) to the vehicle (90) through the connecting terminal portion (23) and charge the vehicular power accumulating device (93) with the supplied alternating-current electricity. In addition, when the electricity of the vehicular power accumulating device (93) outputted as alternating-current electricity from the vehicle (90) is discharged to the connecting terminal portion (23), the power converter (13) is configured to convert the outputted alternating-current electricity into direct-current electricity. Furthermore, the bidirectional power converter (11) is configured to discharge the converted direct-current electricity into the alternating-current power line (4).

With the present configuration, when the vehicular power accumulating device (93) discharges electricity, the power converter (13) once converts alternating-current electricity outputted from the vehicle (90) into direct-current electricity using the electricity supply system different from that when the vehicular power accumulating device (93) is charged with electricity. Furthermore, the converted direct-current electricity can be discharged into the alternating-current power line (4) through the bidirectional power converter (11), which is equipped to charge and discharge the power storage unit (12).

Therefore, without an additional device to the electricity supply system, electricity discharged from the vehicular power accumulating device (93) into the alternating-current power line (4) can be stabilized by utilizing the bidirectional power converter (11) equipped to charge and discharge the power storage unit (12). Thus, electricity discharged from the vehicular battery into the alternating-current power line in the building can be stabilized without provision of an additional complicated device.

Further, the charge-and-discharge unit (13, 20, 41) includes a vehicular power accumulating device discharge control unit (control unit: 30) configured to control discharge of electricity from the vehicular power accumulating device (93) according to an electricity accumulation state of the power storage unit (12) and vehicle information of the vehicle (90), and the vehicular power accumulating device discharge control unit (30) is further configured to operate the power converter (13) to discharge electricity outputted from the vehicle (90) through the bidirectional power converter (11) into the alternating-current power line (4) only in a condition where: electricity supplied to the electric load is insufficient only with electricity discharged from the power storage unit (12) into the alternating-current power line (4); and determining, according to the vehicle information, that the vehicular power accumulating device (93) stores surplus electricity.

With the present configuration, when electric power supply is insufficient only with electric discharge from the power storage unit (12) and when accumulation of electricity of the vehicular power accumulating device (93) has a margin, stable electricity can be discharged from the vehicular power accumulating device (93) into the alternating-current power line (4). Therefore, excessive consumption of electricity accumulated in the vehicular power accumulating device (93) can be avoided.

Further, the charge-and-discharge unit (13, 20, 41) further includes: an announcement unit (42) configured to notify recommendation to discharge electricity outputted from the vehicle (90) into the alternating-current power line (4); and a permission state setting unit (43) configured to set a permission state of the vehicle (90) to output electricity. The vehicular power accumulating device discharge control unit (30) is further configured to: operate the announcement unit (42) to notify the recommendation, in a condition where: electricity supplied to the electric load is insufficient only with electricity discharged from the power storage unit (12) into the alternating-current power line (4); and determining, according to the vehicle information, that the vehicular power accumulating device (93) stores surplus electricity; and operate the power converter (13) to discharge electricity outputted from the vehicle (90) through the bidirectional power converter (11) into the alternating-current power line (4), only in a condition where: the permission state setting unit (43) is thereafter operated to set the permission state.

With the present configuration, when electric power supply is insufficient only with electric discharge from the power storage unit (12) and when accumulation of electricity of the vehicular power accumulating device (93) has a margin, the announcement unit (42) is operated to recommend to discharge electricity from the vehicle (90) into the alternating-current power line (4). Subsequently, a user or the like may operate the permission state setting unit (43) in response to the notice to set the permission state in order to use electricity outputted from the vehicle (90) thereby to discharge stable electricity from the vehicular power accumulating device (93) into the alternating-current power line (4).

With the present configuration, only when a user or the like desires use of surplus accumulation of electricity in the vehicular battery (93), the vehicular battery (93) is caused to discharge stable electricity into the alternating-current power line (4). Thus, excessive consumption of accumulation of electricity in the vehicular battery (93) can be restricted.

The electric power supply system includes: an alternating-current power line (4) wired in a building (1) and connected to an electric load for supplying alternating-current electric power to the electric load; a bidirectional power converter (11) configured to convert bilaterally between an alternating-current electricity and a direct-current electricity; a power storage unit (12) connected to the alternating-current power line (4) through the bidirectional power converter (11) and configured to: be charged with an electricity from the alternating-current power line (4); and discharge a direct-current electricity stored in the power storage unit (12) into the alternating-current power line (4); an alternating-current charge-and-discharge unit (13, 20, 23, 41) equipped with a first connecting terminal portion (23) connectable with a vehicle (90) and configured to: charge a vehicular power accumulating device (93) equipped in the vehicle (90) with an alternating-current electricity supplied from the alternating-current power line (4) through the first connecting terminal portion (23) to the vehicle (90); and when electricity of the vehicular power accumulating device (93) is outputted as alternating-current electricity to the first connecting terminal portion (23), discharge the outputted alternating-current electricity; and a direct-current discharge unit (20, 41, 223) equipped with a second connecting terminal portion (223) connectable with the vehicle (90) and configured to, when electricity of the vehicular power accumulating device (93) is outputted as direct-current electricity from the vehicle (90) to the second connecting terminal portion (223), discharge the outputted direct-current electricity. The alternating-current charge-and-discharge unit (13, 20, 23, 41) includes a power converter (13) configured to convert an alternating-current electricity outputted from the vehicle (90) to the first connecting terminal portion (23) into a direct-current electricity, and the alternating-current charge-and-discharge unit (13, 20, 23, 41) is configured to discharge a direct-current electricity converted with the power converter (13) through the bidirectional power converter (11) into the alternating-current power line (4). The direct-current discharge unit (20, 41, 223) is further configured to discharge direct-current electricity, which is outputted from the vehicle (90) to the second connecting terminal portion (223), through the bidirectional power converter (11) into the alternating-current power line (4).

With the present configuration, when the vehicular power accumulating device (93) equipped in the vehicle (90) is charged, the alternating-current charge-and-discharge unit (13, 20, 23, 41) is configured to supply alternating-current electricity of the alternating-current power line (4) to the vehicle (90) through the first connecting terminal portion (23) and charge the vehicular power accumulating device (93) with the supplied alternating-current electricity. In addition, when the electricity of the vehicular power accumulating device (93) outputted as alternating-current electricity from the vehicle (90) is discharged to the first connecting terminal portion (23), the power converter (13) is configured to convert the outputted alternating-current electricity into direct-current electricity. Furthermore, the bidirectional power converter (11) is configured to discharge the converted direct-current electricity into the alternating-current power line (4). In addition, the direct-current discharge unit (20, 41, 223) is further configured to discharge electricity of the vehicular power accumulating device (93), which is outputted as direct-current electricity from the vehicle (90) to the second connecting terminal portion (223), through the bidirectional power converter (11) into the alternating-current power line (4).

With the present configuration, the vehicular battery (93) is enabled to discharge electricity into the alternating-current power line (4) by using the electricity supply system through the bidirectional power conditioner (11), which is provided for charge and discharge of the storage battery (12). That is, the vehicular battery (93) is enabled to discharge electricity into the alternating-current power line (4) by using the electricity supply system different from the electricity supply system in the case where the vehicular battery (93) is charged with electricity. When alternating-current electricity is outputted from the vehicle (90), the power converter (13) is once caused to convert the outputted alternating-current electricity into direct-current electricity, and the bidirectional power conditioner (11) is caused to discharge the converted direct-current electricity into the alternating-current power line (4). Alternatively, when direct-current electricity is outputted from the vehicle (90), the bidirectional power conditioner (11) is caused to discharge the outputted direct-current electricity into the alternating-current power line (4).

Therefore, without an additional device to the electricity supply system, electricity discharged from the vehicular power accumulating device (93) into the alternating-current power line (4) can be stabilized by utilizing the bidirectional power converter (11) equipped to charge and discharge the power storage unit (12), in both cases where alternating-current electricity and direct-current electricity are outputted from the vehicle (90). Thus, electricity discharged from the vehicular battery into the alternating-current power line in the building can be stabilized without provision of an additional complicated device.

Further, the alternating-current charge-and-discharge unit (13, 20, 23, 41) and the direct-current discharge unit (20, 41, 223) commonly include a vehicular power accumulating device discharge control unit (control unit: 30) configured to control discharge of electricity from the vehicular power accumulating device (93) according to an electricity accumulation state of the power storage unit (12) and vehicle information of the vehicle (90), and the vehicular power accumulating device discharge control unit (30) is further configured to discharge electricity outputted from the vehicle (90) through the bidirectional power converter (11) into the alternating-current power line (4) only in a condition where: electricity supplied to the electric load is insufficient only with electricity discharged from the power storage unit (12) into the alternating-current power line (4); and determining, according to the vehicle information, that the vehicular power accumulating device (93) stores surplus electricity.

With the present configuration, when electric power supply is insufficient only with electric discharge from the power storage unit (12) and when accumulation of electricity of the vehicular power accumulating device (93) has a margin, stable electricity can be discharged from the vehicular power accumulating device (93) into the alternating-current power line (4). Therefore, excessive consumption of electricity accumulated in the vehicular power accumulating device (93) can be avoided.

Further, the electric power supply system includes: an announcement unit (42) configured to notify recommendation to discharge electricity outputted from the vehicle (90) into the alternating-current power line (4); and a permission state setting unit (43) configured to set a permission state of the vehicle (90) to output electricity. The vehicular power accumulating device discharge control unit (30) is further configured to: operate the announcement unit (42) to notify the recommendation, in a condition where: electricity supplied to the electric load is insufficient only with electricity discharged from the power storage unit (12) into the alternating-current power line (4); and determining, according to the vehicle information, that the vehicular power accumulating device (93) stores surplus electricity; and discharge electricity outputted from the vehicle (90) through the bidirectional power converter (11) into the alternating-current power line (4), only in a condition where: the permission state setting unit (43) is thereafter operated to set the permission state.

With the present configuration, when electric power supply is insufficient only with electric discharge from the power storage unit (12) and when accumulation of electricity of the vehicular power accumulating device (93) has a margin, the announcement unit (42) is operated to recommend to discharge electricity from the vehicle (90) into the alternating-current power line (4). Subsequently, a user or the like may operate the permission state setting unit (43) in response to the notice to set the permission state in order to use electricity outputted from the vehicle (90) thereby to discharge stable electricity from the vehicular power accumulating device (93) into the alternating-current power line (4).

With the present configuration, only when a user or the like desires use of surplus accumulation of electricity in the vehicular battery (93), the vehicular battery (93) is caused to discharge stable electricity into the alternating-current power line (4). Thus, excessive consumption of accumulation of electricity in the vehicular battery (93) can be restricted.

The numeral in the parenthesis of each unit represents a correspondence with detailed unit in the embodiments and does not limit the corresponding claimed element.

The subject of the controls is not limited to specific ECU such as the control ECU 30 and may be various one ECU or ECUs.

It should be appreciated that while the processes of the embodiments of the present invention have been described herein as including a specific sequence of steps, further alternative embodiments including various other sequences of these steps and/or additional steps not disclosed herein are intended to be within the steps of the present invention.

While the present disclosure has been described with reference to preferred embodiments thereof, it is to be understood that the disclosure is not limited to the preferred embodiments and constructions. The present disclosure is intended to cover various modification and equivalent arrangements. In addition, while the various combinations and configurations, which are preferred, other combinations and configurations, including more, less or only a single element, are also within the spirit and scope of the present disclosure.

What is claimed is:
1. An electric power supply system comprising:
a first alternating-current power line wired in a building and connected to an electric load for supplying alternating-current electricity to the electric load;

a bidirectional power converter configured to convert bilaterally between alternating-current electricity and direct-current electricity;

a power storage unit connected to the first alternating-current power line through the bidirectional power converter and configured to
  be charged with electricity from the first alternating-current power line and
  discharge direct-current electricity stored in the power storage unit into the first alternating-current power line;

a charge-and-discharge unit equipped with a connecting terminal portion connectable with a vehicle and configured to
  charge a vehicular power accumulating device equipped in the vehicle with alternating-current electricity supplied from the first alternating-current power line through the connecting terminal portion to the vehicle and
  discharge electricity of the vehicular power accumulating device outputted as alternating-current electricity from the vehicle to the connecting terminal portion:

a second alternating-current power line configured to electrically connect the power storage unit with the vehicular power accumulating device; and a direct-current power line configured to electrically connect the power storage unit to the vehicular power accumulating device, wherein:

the charge-and-discharge unit includes a power converter configured to:
  convert alternating-current electricity outputted from the vehicle through the connecting terminal portion into direct-current electricity and
  discharge direct-current electricity converted with the power converter through the bidirectional power converter into the first alternating-current power line, the power converter of the charge-and-discharge unit is directly connected between both the power storage unit and the bidirectional power converter, and the power converter of the charge-and-discharge unit is connected to the second alternating-current power line and is configured to only convert alternating-current electricity to direct-current electricity.

2. The electric power supply system according to claim 1, wherein
the charge-and-discharge unit further includes a control unit configured to control discharge of electricity from the vehicular power accumulating device according to a state of electricity accumulation in the power storage unit and information on the vehicle, and
the control unit is further configured to operate the power converter to discharge electricity outputted from the vehicle through the bidirectional power converter and into the alternating-current power line only in a condition where
  electricity supplied to the electric load is insufficient with only electricity discharged from the power storage unit into the alternating-current power line, and
  determining, according to the information on the vehicle, that the vehicular power accumulating device stores surplus electricity.

3. The electric power supply system according to claim 2, wherein
the charge-and-discharge unit further includes:
  an announcement unit configured to notify recommendation to discharge electricity outputted from the vehicle into the alternating-current power line; and
  a permission state setting unit configured to set a permission state on the vehicle to output electricity,
the control unit is further configured to
  operate the announcement unit to notify the recommendation, in a condition where
    electricity supplied to the electric load is insufficient only with electricity discharged from the power storage unit into the alternating-current power line, and
    determining, according to the information on the vehicle, that the vehicular power accumulating device stores surplus electricity and
  operate the power converter to discharge electricity outputted from the vehicle through the bidirectional power converter into the alternating-current power line, only in a condition where the permission state setting unit is thereafter operated to set the permission state.

4. An electric power supply system comprising:
a first alternating-current power line wired in a building and connected to an electric load for supplying alternating-current electricity to the electric load;

a bidirectional power converter configured to convert bilaterally between alternating-current electricity and direct-current electricity;

a power storage unit connected to the first alternating-current power line through the bidirectional power converter and configured to
  be charged with electricity from the first alternating-current power line and
  discharge direct-current electricity stored in the power storage unit into the first alternating-current power line;

an alternating-current charge-and-discharge unit equipped with a first connecting terminal portion connectable with a vehicle and configured to
  charge a vehicular power accumulating device equipped in the vehicle with alternating-current electricity supplied from the first alternating-current power line through the first connecting terminal portion to the vehicle and
  discharge alternating-current electricity outputted from the vehicular power accumulating device to the first connecting terminal portion when the vehicular power accumulating device discharges the alternating-current electricity;

a second alternating-current power line configured to electrically connect the power storage unit with the vehicular power accumulating device; and a direct-current power line configured to electrically connect the power storage unit to the vehicular power accumulating device; and a direct-current discharge unit equipped with a second connecting terminal portion connectable with the vehicle and configured to discharge direct-current electricity outputted from the vehicle to the second connecting terminal portion when the vehicular power accumulating device discharges the direct-current electricity, wherein
the alternating-current charge-and-discharge unit includes a power converter configured to convert alternating-current electricity outputted from the vehicle to the first connecting terminal portion into direct-current electricity, the alternating-current charge-and-discharge unit is configured to discharge direct-current electricity converted with the power converter through the bidirectional power converter into the first alternating-current power line, the direct-current discharge unit is further configured to discharge direct-current electricity, which is outputted from the vehicle to the second connecting terminal portion, through the bidirectional power converter into the first alternating-current power line, and the power converter of the alternating-current charge-and-discharge unit is directly connected between both the power storage unit and the bidirectional power converter, and the power converter of the charge-and-discharge unit is connected to the second alternating-current power line and is configured to only convert alternating-current electricity to direct-current electricity.

5. The electric power supply system according to claim 4, wherein the alternating-current charge-and-discharge unit and the direct-current discharge unit commonly include a control unit configured to control discharge of electricity from the vehicular power accumulating device according to a state of electricity accumulation in the power storage unit and information on the vehicle, the control unit is further configured to cause discharge of electricity outputted from the vehicle through the bidirectional power converter into the alternating-current power line only in a condition where electricity supplied to the electric load is insufficient only with electricity discharged from the power storage unit into the alternating-current power line, and determining, according to the information on the vehicle, that the vehicular power accumulating device stores surplus electricity.

6. The electric power supply system according to claim 5, further comprising:

an announcement unit configured to notify recommendation to discharge electricity outputted from the vehicle into the alternating-current power line; and a permission state setting unit configured to set a permission state on the vehicle to output electricity, wherein the control unit is further configured to operate the announcement unit to notify the recommendation, in a condition where electricity supplied to the electric load is insufficient only with electricity discharged from the power storage unit into the alternating-current power line, and determining, according to the information on the vehicle, that the vehicular power accumulating device stores surplus electricity and cause discharge of electricity outputted from the vehicle through the bidirectional power converter into the alternating-current power line, only in a condition where the permission state setting unit is thereafter operated to set the permission state.

7. The electric power supply system according to claim 1, further comprising:

a charge power line for charging the vehicular power accumulating device; and a discharge power line for discharging the vehicular power accumulating device; wherein the power converter of the charge-and-discharge unit is arranged in the discharge power line that is different than the charge power line.

8. The electric power supply system according to claim 4, further comprising:

a charge power line for charging the vehicular power accumulating device; and a discharge power line for discharging the vehicular power accumulating device; wherein the power converter of the charge-and-discharge unit is arranged in the discharge power line that is different than the charge power line.

9. The electric power supply system according to claim 1, wherein the charge-and-discharge unit further includes a control unit configured to control discharge of electricity from the vehicular power accumulating device according to a state of electricity accumulation in the power storage unit and information on the vehicle, and the control unit is further configured to operate the power converter to discharge electricity outputted from the vehicular power accumulating device through the power converter directly to the bidirectional power converter, through the bidirectional power converter and directly into the alternating-current power line only in a condition where electricity supplied to the electric load is insufficient with only electricity discharged from the power storage unit into the alternating-current power line, and determining, according to the information on the vehicle, that the vehicular power accumulating device stores surplus electricity.

* * * * *